US011102691B2

(12) United States Patent
Gronstad et al.

(10) Patent No.: US 11,102,691 B2
(45) Date of Patent: *Aug. 24, 2021

(54) TRIGGERING TERMINAL HANDOVER AFTER SESSION-REQUEST MESSAGE

(71) Applicant: T-Mobile USA, Inc., Bellevue, WA (US)

(72) Inventors: Egil Gronstad, Encinitas, CA (US); Karunakalage Viraj Rakitha Silva, Renton, WA (US); Brian Allan Olsen, Bellevue, WA (US); Kun Lu, Bellevue, WA (US); Ming Shan Kwok, Seattle, WA (US); Salvador Mendoza, Issaquah, WA (US); John Humbert, Roeland Park, KS (US); Jun Liu, Issaquah, WA (US); Alan Denis MacDonald, Bellevue, WA (US); Christopher H. Joul, Bellevue, WA (US); Neng-Tsann Ueng, Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/667,712

(22) Filed: Oct. 29, 2019

(65) Prior Publication Data
US 2020/0068468 A1 Feb. 27, 2020

Related U.S. Application Data

(63) Continuation of application No. 16/055,696, filed on Aug. 6, 2018.

(51) Int. Cl.
*H04L 12/28* (2006.01)
*H04W 36/14* (2009.01)
(Continued)

(52) U.S. Cl.
CPC ............ *H04W 36/14* (2013.01); *H04W 8/08* (2013.01); *H04W 36/38* (2013.01); *H04W 48/18* (2013.01); *H04W 60/04* (2013.01); *H04W 88/06* (2013.01)

(58) Field of Classification Search
CPC ..................................... H04L 12/28
(Continued)

(56) References Cited

U.S. PATENT DOCUMENTS 8,995,278 B1 3/2015 Vivanco et al.
9,521,268 B2 12/2016 Walley et al.
(Continued)

FOREIGN PATENT DOCUMENTS

EP 2763465 A2 8/2014

OTHER PUBLICATIONS

The PCT Search Report and Written Opinion dated Nov. 29, 2019 for PCT Application No. PCT/US2019/042972, 13 pages.
(Continued)

*Primary Examiner* — Dang T Ton
(74) *Attorney, Agent, or Firm* — Lee & Hayes, P.C.

(57) ABSTRACT

A first access node of a first wireless access network receives, via a first entry node of the first network, a service-request message from a terminal registered with the first network. The first access node requests first network-capacity information associated with the first wireless access network from the first entry node, and second network-capacity information associated with a second wireless access network from a second access node of the second network. The first access node selects a target access network based on the service-request message and the first and second network-capacity information. The first access node, in response to a selection of the first wireless access network, sends a service-reply message to the first entry node.
(Continued)

The first access node, in response to a selection of the second wireless access network, triggers a handover of the terminal to the second wireless access network.

20 Claims, 12 Drawing Sheets

(51) Int. Cl.
    *H04W 60/04*    (2009.01)
    *H04W 48/18*    (2009.01)
    *H04W 88/06*    (2009.01)
    *H04W 8/08*     (2009.01)
    *H04W 36/38*    (2009.01)

(58) Field of Classification Search
    USPC .......................................................... 370/329
    See application file for complete search history.

(56) References Cited

U.S. PATENT DOCUMENTS

| | | |
|---|---|---|
| 2007/0115899 A1 | 5/2007 | Ovadia et al. |
| 2008/0120129 A1 | 5/2008 | Seubert et al. |
| 2013/0295948 A1* | 11/2013 | Ye .......................... H04W 74/06 455/452.1 |
| 2016/0344642 A1 | 11/2016 | Brisebois et al. |
| 2017/0325273 A1 | 11/2017 | Chaugule et al. |
| 2017/0366955 A1 | 12/2017 | Edge |

OTHER PUBLICATIONS

Office Action for U.S. Appl. No. 16/055,696, dated Jan. 28, 2020, Gronstad, "Triggering Terminal Handover After Session-Request Message", 6 pages.

Office Action for U.S. Appl. No. 16/055,696, dated Apr. 16, 2020, Gronstad, "Triggering Terminal Handover After Session-Request Message", 9 pages.

3GPP TS 23.501 V15.1.0 Technical Report, 3GPP Organizational Partners, Mar. 2018, pp. 3-10, 65-66, 119-123, 131-134, and 142-155.

3GPP TS 23.502 V15.1.0 Technical Report, 3GPP Organizational Partners, Mar. 2018, pp. 3-11, 15-22, 26-35, and 125-153.

3GPP TS 38.401 V15.0.0 Technical Report, 3GPP Organizational Partners, Dec. 2017, pp. 3 and 6-15.

ETSI TS 136 331 V13.1.0, "LTE; Evolved Universal Terrestrial Radio Access (E-UTRA)", Apr. 2016, pp. 1, 45-48, 64-72.

Office Action for U.S. Appl. No. 16/055,696, dated Dec. 11, 2020, Gronstad, "Triggering Terminal Handover After Session-Request Message", 12 pages.

* cited by examiner

TRIGGERING TERMINAL HANDOVER AFTER SESSION-REQUEST MESSAGE

CROSS-REFERENCE TO RELATED APPLICATION

This application is a continuation of, and claims priority to, U.S. application Ser. No. 16/055,696, filed on Aug. 6, 2018, which is fully incorporated by reference herein.

BACKGROUND

Modern telecommunications networks such as cellular telephone networks can support a variety of types of session, such as voice, video, or messaging. Second-generation (2G) and third-generation (3G) cellular networks such as Global System for Mobile Communications (GSM) networks or Universal Mobile Telecommunications System (UMTS) networks generally carry streaming media over circuit-switched (CS) connections. Fourth-generation (4G) cellular networks such as Long Term Evolution (LTE) networks and fifth-generation (5G) cellular networks such as the Third-Generation Partnership Project (3GPP) 5G System generally carry streaming media over packet-switched (PS) connections. Such packet-switched connections can provide greater speed and throughput than do CS connections, and can make packet-switched data from other networks, such as the Internet, more readily available. However, many networks include wireless access networks spanning multiple technology generations due to the substantial infrastructure investment needed to expand cellular networks. Due to differences in network deployment and the radio environment, a lower-generation access network may provide a network terminal speed and quality comparable or, at times, better than, higher-generation access networks.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. For brevity of illustration, in the diagrams herein, an arrow beginning with a diamond connects a first component or operation (at the diamond end) to at least one second component or operation that is or can be, in at least one example, included in the first component or operation.

DETAILED DESCRIPTION

Overview

This disclosure describes, in part, a telecommunications network configured to implement attach control of a terminal. In some examples, a first access network can cause a terminal to move to a second, different access network if the second access network is likely to be able to provide superior service for particular types of sessions used by that terminal. For example, a 5G access network can move a terminal to an LTE access network in an area with strong LTE coverage and weak 5G coverage, if the terminal is using or is configured to use streaming-media sessions. Attach control can be based on the local, real-time radio environment of a terminal, including load conditions or effective throughput in the first and second access networks. Attach control can also be based on the service(s) or mix of service(s) that a terminal is currently using or wishes to use. The telecommunications network can cause the terminal to attach to an access network that can effectively serve that terminal. Attach control can be performed periodically, e.g., when the terminal requests a network service or at other times.

As used herein, a "terminal" is a communication device, e.g., a cellular telephone or other user equipment (UE), configured to perform, or intercommunicate with systems configured to perform, techniques described herein. Terminals can include, e.g., wireless or wired voice- or data-communication devices. A terminal can include a user interface (e.g., as does a smartphone), but is not required to. For example, a streaming server configured to provide audio or visual content on demand can be a terminal. Such a terminal may not include a user interface, and may instead respond to other terminals that form queries and send those queries to the server in response to actions taken via interfaces at those other terminals. A terminal can be, e.g., a cellular phone, smartphone, tablet computer, personal digital assistant (PDA), personal computer (PC), laptop computer, media center, work station, etc.

The terms "session" and "communication session" as used herein includes a communications path for bidirectional exchange of data among two or more terminals. Example sessions include voice and video calls, e.g., by which human beings converse, a data communication session, e.g., between two electronic systems or between an electronic system and a human being, or a Rich Communication Suite (RCS, also known as JOYN) session. Sessions can be carried, e.g., by cellular or data networks, e.g., LTE or IEEE 802.11 (WIFI). Other examples of networks are discussed below.

Figure 1:
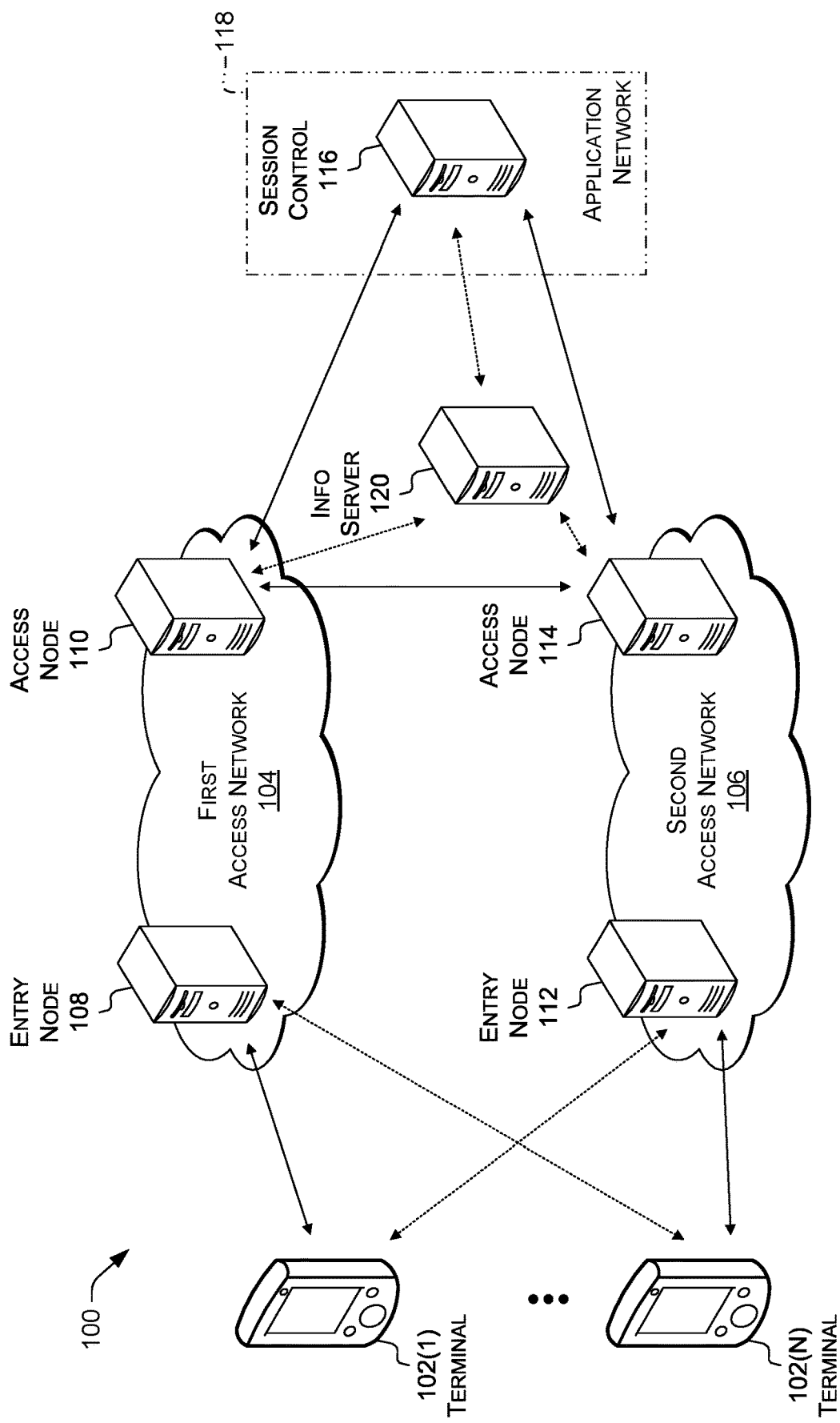
FIG. 1 illustrates an overview of nodes and devices involved in session-based attach control of a terminal.

Subsection headers in this Detailed Description are solely for convenience in reading. No limitations are implied by the presence or arrangement of the subsection headers, or by the separation of features between those subsections. Some examples include features from only one subsection. Some examples include features from more than one subsection. Illustrative Telecommunications Network and Components FIG. 1 illustrates an example telecommunications network 100 and shows an overview of nodes and devices involved in provision of attach-control services to terminals. The telecommunications network 100 includes terminals 102(1)-102(N) (individually or collectively referred to herein with reference 102), N≥1. A terminal 102 may be or include a cellular phone or other type of terminal such as those described above. Terminal 102 can be configured to originate or receive communications sessions.

In some examples, terminal 102 can communicate, e.g., via a first access network 104 or a second access network 106. Terminal 102 may participate in a handover between first access network 104 and second access network 106, e.g., as a user moves in and out of coverage areas of individual access networks 104 or 106. A single-connectivity (or single-radio, SR) terminal 102 can communicate via one access network 104, 106 at a time. A dual-connectivity (dual-radio, DR) terminal 102 can communicate concurrently via both access network 104 and access network 106, as shown by the stippled lines. Some examples herein relate to SR terminals 102.

In the illustrated example, first access network 104 includes a first entry node 108, e.g., a 5G gNodeB, and a first access node 110, e.g., a 5G Access and Mobility Management Function (AMF). Second access network 106 includes a second entry node 112, e.g., an LTE eNodeB, and a second access node 114, e.g., an LTE mobility management entity (MME). Other examples of access nodes include a GSM mobile switching center (MSC) server (MSS). Terminal 102 can communicate via the respective entry nodes 108, 112 with the respective access nodes 110, 114. The first access node 110 and the second access node 114 are examples of access nodes or devices that can control or modify communications with terminal 102 via access network(s) 104 or 106.

A handover between access networks can include, for example, a handover from packet-switched first access network 104 to circuit-switched second access network 106. However, handover is not limited to that example. For example, an SR terminal 102 can be handed over from a 5G access network to an LTE access network, or in general between a first access network of a first type and a second access network, e.g., of the first type or of a second, different type (e.g., PS to CS or vice versa).

The terminal 102 can be configured to initiate or receive a communication session, such as a voice call, a video call, or another sort of synchronous communication. Initiation of such communications may involve communication clients and Session Initiation Protocol (SIP, RFC 3261) clients communicatively connected with components of the telecommunications network, e.g., session-control node 116. In various embodiments, the session-control node 116 represents components of an Internet Protocol (IP) Multimedia Subsystem (IMS) core network. Session-control node 116 can be part of an application network 118, e.g., an IMS network or other network providing services to terminal 102. Application network 118 can also be referred to as an "upper-level" network that uses the services provided by access networks 104, 106 to communicate with terminals 102. Network 100 can include or be connected with any number of access networks 104, 106 or any number of application networks 118.

In some examples, access nodes 110, 114, or session-control node 116, can communicate with an information server 120 to retrieve information about terminals 102 or subscribers to the telecommunications network 100. For example, information server 120 can be or include an LTE HSS or HLR, or a 5G User Data Management (UDM) function or User Data Repository (UDR). Although shown as separate from access networks 104 and 106 and from application network 118, information server 120 can be part of any of those, or can communicate with ones of those of which it is or is not part, in various examples.

Each of the first access node 110, the second access node 114, and the session-control node 116, may each be or include a server or server farm, multiple, distributed server farms, a mainframe, a work station, a PC, a laptop computer, a tablet computer, an embedded system, or any other sort of device or devices. In one implementation, one or more of first access node 110, the second access node 114, and the session-control node 116 may represent a plurality of computing devices working in communication, such as a cloud-computing node cluster. Also, the first access node 110, the second access node 114, and the session-control node 116 may each be or include nodes or devices of a telecommunications network. Examples of such components are described below with reference to FIG. 2.

As noted above, SIP can be used to establish and manage communication sessions. SIP is an IP-based protocol, so terminal 102 exchanges SIP messages via an IP link with session-control node 116. To establish IP connectivity via a 5G access network 104, terminal 102 sends a Service Request message to access network 104, e.g., to a gNodeB of a 5G access network. The gNodeB communicates with the AMF to obtain an IP address for terminal 102. The gNodeB can also obtain other information, e.g., the IP address of a session-control node 116. Session-control node 116 can include, e.g., a P-CSCF via which terminal 102 can access IMS services. The gNodeB responds to terminal 102 with the requested information. Terminal 102 is then able to communicate via IP with session-control node 116 or other IP-connected nodes or devices.

Session-control services are generally provided by session-control node 116 independently of the type of access network(s) used for any particular communication session. This permits providing consistent session-control services between, e.g., PS and CS terminals, or throughout a communication session when one party leaves a PS coverage area and hands over to a CS access network. Similarly, access-network selection, a component of attach control, is generally performed with respect to the radio characteristics of each available access network 104, 106, without regard to the types of sessions for which the communication link will be used.

However, in areas with coverage from multiple RANs, an SR terminal 102 may not be connected to the RAN that can provide the best experience for a particular service or a particular type of session. For example, in an area with both 5G and LTE coverage, it may be desirable to provide video-calling services over the LTE network if the 5G network is heavily loaded or providing a weak signal at terminal 102, even though 5G would normally be used. Some examples therefore select an access network based at least in part on information from the terminal 102 about which services are desired. Some examples select an access network based at least in part on information about the present capacities of multiple available access networks. Some examples take into account both information from the terminal 102 and information of access-network capacity.

In some examples, the first access network 104 or the second access network 106 may be any sort of access network, such as a GSM or UMTS network; a universal terrestrial radio network (UTRAN) or an Enhanced Data rates for GSM Evolution (EDGE) radio access network (GERAN); an evolved universal terrestrial radio access network (E-UTRAN); a 3GPP 5G access network; a WIFI (IEEE 802.11) or other LAN access network; or a satellite or terrestrial wide-area access network such as a wireless microwave access (WIMAX) network. In some examples, the first access network 104 or the second access network 106 may include a base station (an eNodeB or gNodeB), as well as a radio network controller (RNC). In some examples, the first access network 104 or the second access network 106 may use any sort of air interface, such as a code division multiple access (CDMA), time division multiple access (TDMA), or frequency division multiple access (FDMA) air interface. In some examples, the first access network 104 may provide packet-switched connections and the second access network 106 may provide circuit-switched connections. In some examples, the first access network 104 may be a packet-switched cellular type of access network and the second access network 106 may be a packet-switched local-area-network type of access network. Examples of LAN access networks can include WIFI and IEEE 802.15.1 (BLUETOOTH). In some examples, access networks 104, 106 may include any network configured to transport IP packets, e.g., IPv4, IPv6, or any other evolution of an IP-based technology.

In some examples, a non-cellular network can carry voice traffic using VoIP or other technologies as well as data traffic, or a cellular network can carry data packets using HSPA, LTE, or other technologies, as well as voice traffic. Some cellular networks carry both data and voice in a PS format. For example, many LTE networks carry voice traffic in data packets according to the voice-over-LTE (VoLTE) standard.

In some examples, wired access networks may be used, exclusively or in combination with wireless access networks. Examples include Plain Old Telephone Service, POTS, or Public Switched Telephone Network, PSTN, lines, optical (e.g., Synchronous Optical NETwork, SONET) technologies, Asynchronous Transfer Mode (ATM), and other network technologies, e.g., configured to transport IP packets. In some examples, the telecommunications network 100 can include or be communicatively connected with an interworking function (IWF) or other node or device configured to bridge networks, e.g., LTE, 3G, and POTS networks. In some examples, the IWF can bridge Signaling System 7 (SS7) traffic from the PSTN into the telecommunications network 100, e.g., permitting PSTN customers to originate sessions with cellular customers and vice versa.

As used herein, a message "sent to," "transmitted to," or "transmitted toward" a destination, or similar terms, can be sent directly to the destination, or can be sent via one or more intermediate network nodes or devices to the destination. Those intermediate network nodes or devices can include access nodes 110, 114. Similarly, a message "received from" a destination can be received directly from the destination, or can be received via one or more intermediate network nodes or devices from the destination. A message passing through one or more intermediate network nodes or devices can be modified by those network nodes or devices, e.g., by adding or removing framing, or by changing a presentation of at least part of the message, e.g., from a SIP start-line to a SIP header or vice versa. As used herein, a "reply" message is synonymous with a "response" message. The term "reply" is used for clarity, e.g., when discussing reply messages sent in response to the receipt of messages.

Figure 2:
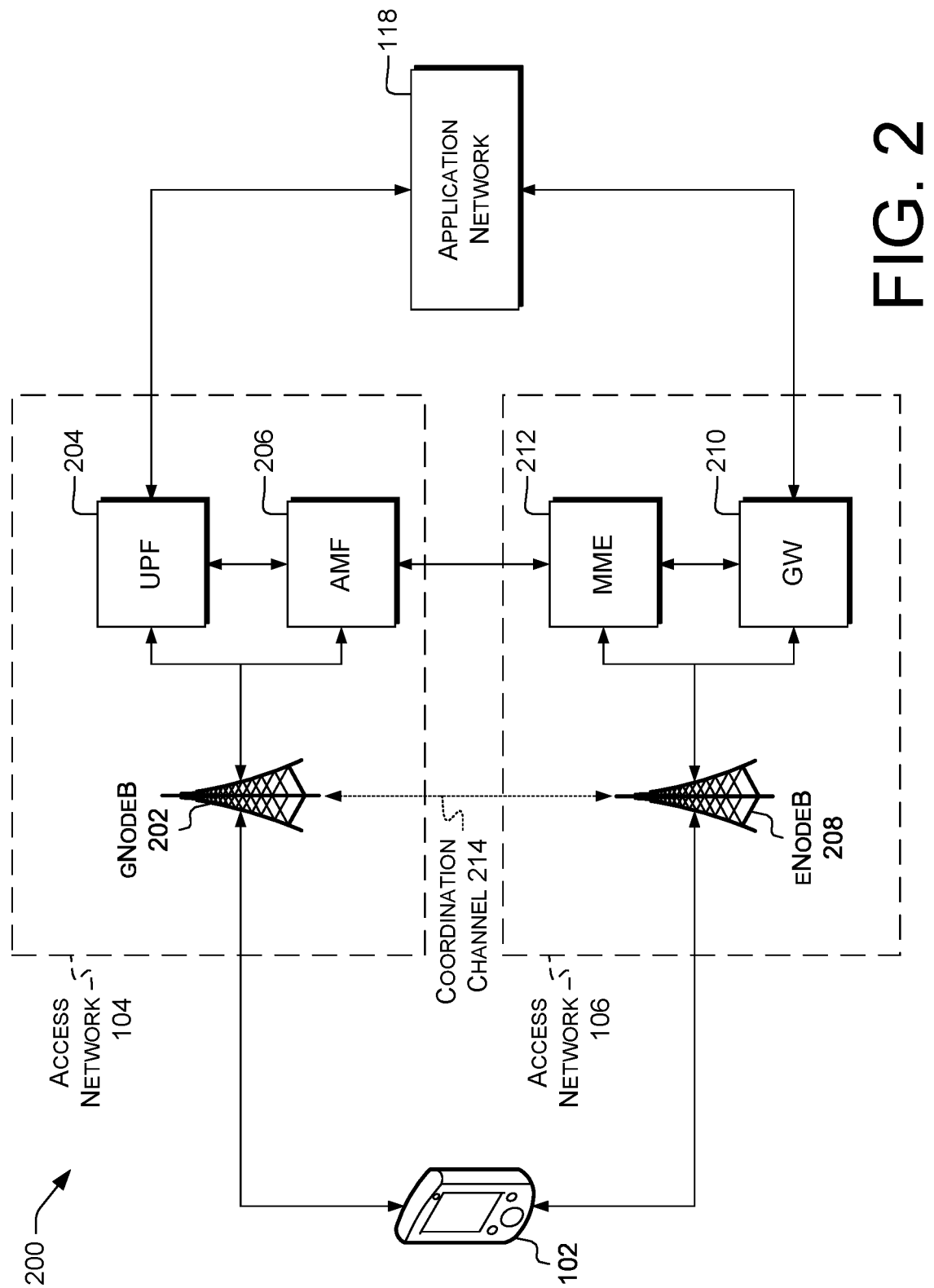
FIG. 2 illustrates an example telecommunications network, including multiple access networks to which a terminal can attach.

FIG. 2 illustrates an example telecommunications network 200. The illustrated blocks represent network functions that can be implemented as standalone device(s), or combined with other network functions into a single device or collection of device(s). The nodes, devices, and networks illustrated in FIG. 2 can be examples of the nodes, devices, and networks illustrated in FIG. 1 and described above. Accordingly, the descriptions of the nodes, devices, and networks of FIG. 1 apply to the nodes, devices, and networks of FIG. 2. Some examples herein, e.g., in FIG. 2, and in FIGS. 4-12, below, are given in the context of an originating terminal 102. However, this is not limiting. Corresponding techniques and structures can additionally or alternatively be used with destination (or "terminating," "receiving") terminals 102.

Single-radio terminal 102 can attach to access networks 104 or 106 of the telecommunications network 200. In the example shown, access network 104 includes a 5G PS access network and access network 106 includes an LTE PS access network. 5G access network 104 includes a gNodeB 202 that provides connectivity to the 5G access network 104. The gNodeB 202 is connected with a user-plane function (UPF) 204 and with an AMF 206. LTE access network 106 includes an eNodeB 208, e.g., a 4G base station or other access point, that provides connectivity to the LTE access network 106. The eNodeB 208 is connected with a gateway 210 ("GW"), e.g., an LTE S-GW or P-GW, and an MME 212. Terminal 102 can communicate with application network 118 via UPF 204 or GW 210. AMF 206 and MME 212 can communicate to carry out attach control in various examples described herein. For brevity herein, the term "entry node" refers to a gNodeB 202, eNodeB 208, RNC, WIFI access point (AP), or other network device that is the initial node that terminal 102 communicates with in order to access the services of a corresponding access network.

The telecommunications network 200 may also include a number of devices or nodes not illustrated in FIG. 2. Nonlimiting examples of such devices or nodes include an ATGW, a serving GPRS support node (SGSN), a gateway GPRS support node (GGSN), a policy control rules function (PCRF) node, a session border controller (SBC), or a non-3GPP-access interworking function (N3IWF). Similarly, throughout this disclosure, other nodes or devices can be used in conjunction with listed nodes or devices. For example, a telecommunications network can include many core network nodes or devices, only some of which implement functions described herein for core network nodes or devices.

In some examples, gNodeB 202 and eNodeB 208 are communicatively connected via a coordination channel 214. This can permit gNodeB 202 and eNodeB 208 to share data about the load on the respective access networks 104, 106. For example, gNodeB 202 and eNodeB 208 can be embodied in a common set of computing hardware, and can communicate via inter-process communication (IPC) techniques such as signals, pipes, sockets, or shared memory, or inter-virtual-machine (inter-VM) sockets or other inter-VM communication techniques. Additionally or alternatively, gNodeB 202 and eNodeB 208 can be arranged to intercommunicate with each other, e.g., directly (via a physical cable connection) or via a logically-direct connection (e.g., via a virtual private network, VPN, or tunnel connection running over a network). In some examples, gNodeB 202 and eNodeB 208 are installed at a common co-location facility and are communicatively connected within that facility. Other nodes or sets of nodes can additionally or alternatively be connected using coordination channels.

Figure 3:
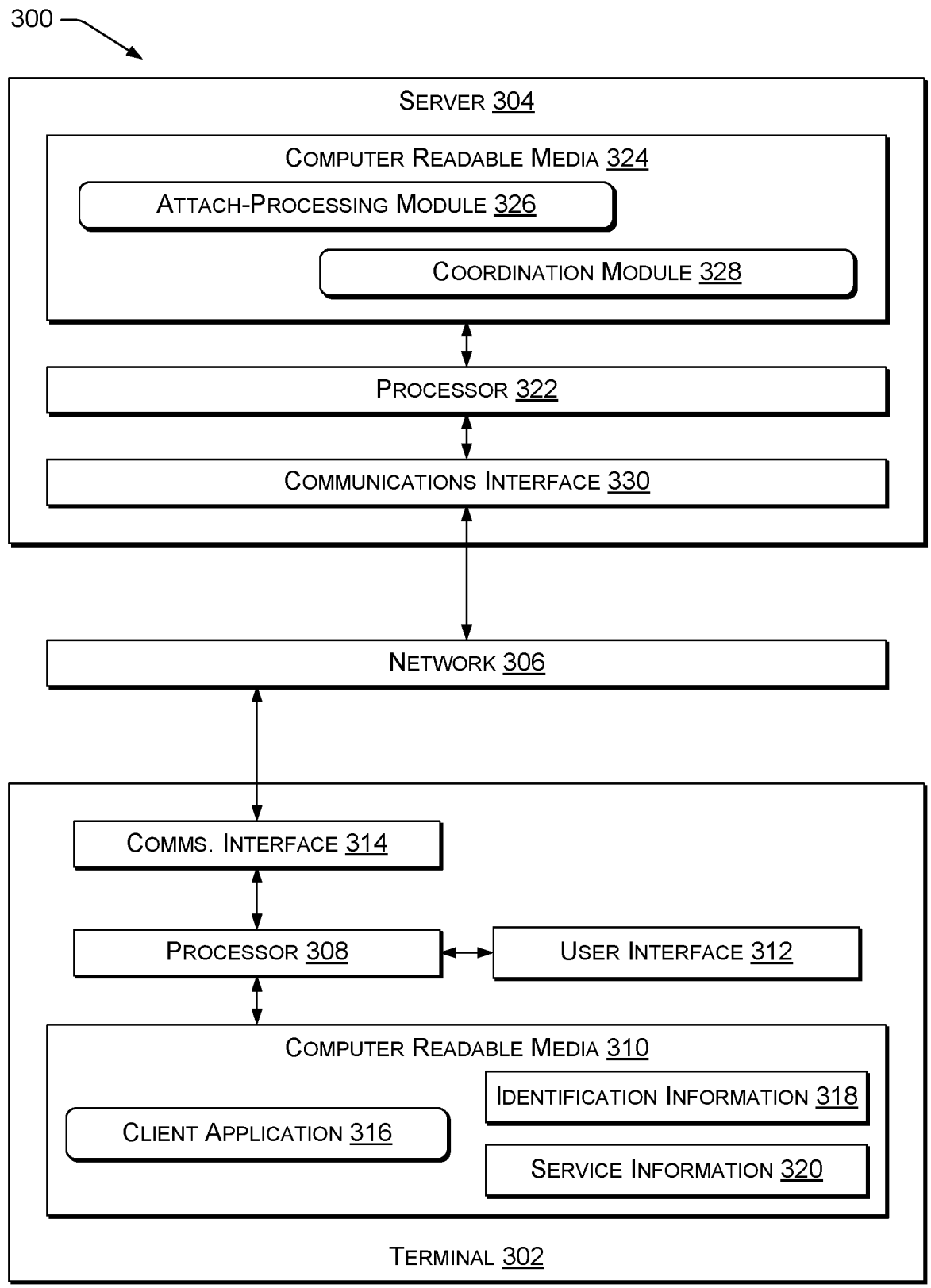
FIG. 3 is a block diagram illustrating components of a system that provides session-based attach control according to some implementations.

FIG. 3 is a block diagram illustrating a system 300 permitting attach control according to some implementations. The system 300 includes a terminal 302 (which can represent terminal 102) communicatively connectable with a server 304 via a network 306. The server 304 can represent an access node 110 or 114, a session-control node 116, or another control system of a telecommunications network configured to perform functions described herein. Server 304 can be implemented using dedicated or shared (e.g., cloud) computing hardware. The network 306 can include one or more networks, such as a cellular network, e.g., 5G, or a non-cellular network, e.g., WIFI. Example network technologies are described above with reference to FIG. 1.

The terminal 302 can include one or more processors 308, e.g., one or more processor devices such as microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs). Terminal 302 can include one or more computer readable media (CRM) 310, such as semiconductor memory (e.g., random access memory (RAM), solid state drives (SSDs), or the like), disk drives (e.g., platter-based hard drives), another class of computer-readable media, or any combination thereof. The terminal 302 can further include a user interface (UI) 312, e.g., including an electronic display device, a speaker, a vibration unit, a touchscreen, or other devices for presenting information to a user and receiving commands from the user. The terminal 302 can further include one or more communications interface(s) 314, e.g., radio(s) or other network interface(s), configured to selectively communicate (wired or wirelessly) via the network 306, e.g., via an access network 104 or 106.

CRM 310 can be used to store data and to store instructions that are executable by the processors 308 to perform various functions as described herein. CRM 310 can store various classes of instructions and data, such as an operating system, device drivers, program modules, etc. The processor-executable instructions can be executed by the processors 308 to perform the various functions described herein. CRM 310 can be or include computer-readable storage media. Computer-readable storage media include, but are not limited to, RAM, ROM, EEPROM, flash memory or other semiconductor memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information and which can be accessed by the processors 308.

CRM 310 can include processor-executable instructions of a client application 316. In some examples, terminal 302 can be configured to, e.g., by executing the processor-executable instructions, perform functions described herein with reference to FIGS. 4-12. The client application 316, e.g., a native or other dialer, can permit a user to originate and receive communication sessions, e.g., voice or Unstructured Supplementary Service Data (USSD), associated with the terminal 302. The client application 316 can additionally or alternatively include an SMS, RCS, or presence client, or a client of another telephony service offered by the server 304.

CRM 310 can store identification information 318 identifying the terminal 302. The identification information 318 can include, e.g., an IMEI of terminal 102 or an IMSI identifying the subscriber using terminal 302. CRM 310 can store credentials (omitted for brevity) used for access, e.g., to IMS or RCS services. In some examples, CRM 310 includes a Subscriber Identity Module (SIM) card providing secure credential storage. CRM 310 can store service information 320 relating to session types used by terminal 302, e.g., as discussed herein with reference to FIG. 4, 5, or 7-12.

The server 304 can include one or more processors 322 and one or more CRM 324. CRM 324 can be used to store processor-executable instructions of an attach-processing module 326 or a coordination module 328. The coordination module 328 can communicate with an access device to transfer information regarding session types requested by terminal 302, e.g., as discussed herein with reference to FIG. 7-8 or 11-12. The processor-executable instructions of modules 326 and 328 can be executed by the one or more processors 322 to perform various functions described herein. In some examples, server 304 can be configured to, e.g., by executing the processor-executable instructions, perform functions described herein with reference to FIGS. 4-12.

In some examples, server 304 can communicate with (e.g., is communicatively connectable with) terminal 302 or other nodes or devices via one or more communications interface(s) 330, e.g., network transceivers for wired or wireless networks, or memory interfaces. Example communications interface(s) 330 can include Ethernet or FIBRE CHANNEL transceivers, WIFI radios, or DDR memory-bus controllers (e.g., for DMA transfers to a network card installed in a physical server 304). Communications interface(s) 314 can include any of the components described in this paragraph.

In some examples, processor 308 and, if required, CRM 310, are referred to for brevity herein as a "control unit." For example, a control unit can include a CPU or DSP and instructions executable by that CPU or DSP to cause that CPU or DSP to perform functions described herein. Additionally or alternatively, a control unit can include an ASIC, FPGA, or other logic device(s) wired (physically or via blown fuses or logic-cell configuration data) to perform functions described herein. Other examples of control units can include processor 322 with, if required, CRM 324.

Illustrative Messages and Operations

Figure 4:
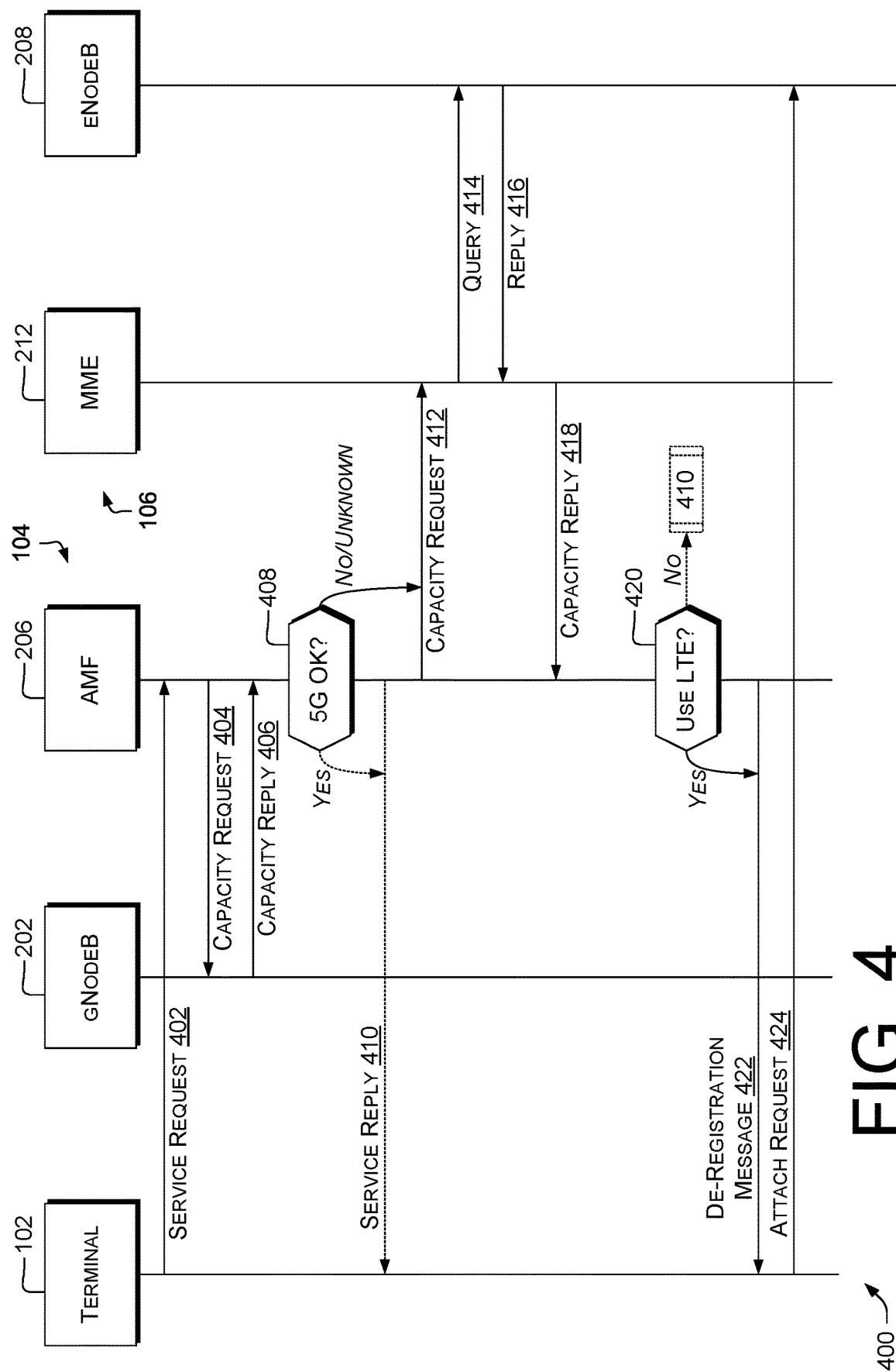
FIG. 4 is a call flow showing an example of attach control with respect to a terminal.

FIG. 4 is a partial call flow 400 showing examples of attach control, e.g., as discussed above with reference to FIGS. 1 and 2. The call flow of FIG. 4 includes terminal 102 connected to and registered with access network 104, which includes gNodeB 202 and AMF 206 (or another access node 110 of access network 104, e.g., a 5G Session Management Function, SMF, and likewise throughout). AMF 206 is communicatively connected with MME 212 of access network 106, which in turn communicates with eNodeB 208.

To establish a new session, terminal 102 sends a service-request message 402 to AMF 206. The service-request message 402 can include service data describing the requested service or its network-capacity requirements. Service data can include, e.g., a quality-of-service (QoS) class indicator (QCI), allocation retention priority (ARP), or 5G QoS flow identifier (ID). For example, a voice call can have QCI 1; a Web-browsing session can have QCI 6 and ARP 7; and a speed-test connection can have QCI 4 and ARP 6.

Before responding to service-request message 402, AMF 206 sends a network-capacity-information (NCI, "Capacity") request 404 to gNodeB 202. The gNodeB 202 responds with NCI reply 406 including NCI associated with access network 104. For example, the NCI can include data indicating the current load, signal conditions, or other elements of the present state of access network 104. The current load can be indicated or represented in the NCI, e.g., as a percentage of bandwidth available, total bits-per-second (bps) (or other capacity measure) currently in use (e.g., averaged over 1 s, 5 s, or other time intervals, or on a rolling basis, e.g., an exponentially-weighted moving average, EWMA), number of terminals attached, or signal-to-noise ratio of one or more wireless channel(s). In some examples, the NCI can include data indicating a percentage CPU load of gNodeB 202 or processing elements thereof, loadavg of gNodeB 202 or processing elements thereof, percentage or absolute power usage of gNodeB 202 or processing elements thereof, backhaul bps used (absolute or percentage), or ratio of guaranteed bit rates allocated to available bit rate remaining. In some examples, the NCI can indicate the width of a frequency allocation of access network 104 (e.g., 5 MHz or 10 MHz), or can indicate whether carrier aggregation is in use. In some examples, AMF 206 can perform block 408 or transmit message 412 subsequent, or in response, to receiving NCI reply 406.

At 408 ("5G OK?"), AMF 206 determines, based on the information in NCI reply 406, whether access network 104 has enough capacity to effectively provide the requested service. If so ("Yes"; dashed lines), AMF 206 sends service-reply message 410 to terminal 102 to continue the process of establishing the requested session. The remaining steps of establishment can be carried out, e.g., as in the GSM, UMTS, LTE or 5G standards. If AMF 206 cannot determine that access network 104 has enough capacity, AMF 206 performs further processing before replying to the service-request message 402 ("No/Unknown"; solid lines). In some examples, if the NCI associated with first access network 104 indicates that at least a predetermined throughput is available, e.g., >1 Gbps, AMF 206 can determine that access network 104 does have enough capacity to effectively provide the requested service.

In some examples, AMF 206 can determine, at block 408, that access network 104 (e.g., 5G) does not have enough capacity to effectively provide the requested service if at least one of the following conditions holds. (A) The NCI indicates that the load exceeds a predetermined threshold (e.g., 70%). (B) The NCI indicates that the load exceeds a predetermined threshold selected based at least in part on another factor, e.g., bps usage. For example, the threshold can be 70% load when at or above 100 kbps of aggregate use, or 90% load for below 100 kbps. (C) The NCI indicates that the load exceeds a predetermined threshold selected based at least in part on a priority associated with a particular service. For example, the threshold can be 70% for low-priority traffic or 90% for high-priority traffic. (D) The NCI indicates that the load exceeds a predetermined threshold selected based at least in part on subscriber or account characteristics (e.g., type). (E) The NCI indicates that the load exceeds a predetermined threshold selected based at least in part on the time of day. For example, thresholds can be determined empirically based on historical data. (F) The requested service meets a predetermined offload-percentage criterion determined, e.g., according to the current load. For example, at a particular load level, 25% of requests for a predetermined service can be offloaded from access network 104. The particular sessions to offload this can be selected randomly (or pseudorandomly, and likewise throughout), in round-robin fashion, or using other scheduling techniques. (G) The requested services meets a predetermined traffic-based offload criterion selected based at least in part on at least one of load (indicated in the NCI), service type or traffic type of the requested service, bps requested for the service, or priority of the service.

AMF 206 sends a second NCI request 412 to MME 212. MME 212 in turn sends a query 414 to eNodeB 208, which responds with reply 416 indicating load or capacity of second access network 106. MME 212 then determines a second NCI reply 418 including NCI associated with access network 106 based at least in part on reply 416, and sends second NCI reply 418 to AMF 206. The NCI associated with access network 106 can have any of the types described herein with reference to the NCI associated with access network 104.

Additionally or alternatively, AMF 206 can send an NCI request 404 or 412 and receive a corresponding NCI reply 406 or 418 periodically or otherwise not directly in response to a service-request message 402. AMF 206 can send an NCI request 404 or 412, e.g., periodically, continually, randomly, on a schedule, based on load, when triggered by changes in load, upon request, or at other times, in any combination. A periodic schedule can have a time interval set in configuration data, e.g., in the range 30 s-5 min.

At 420 ("Use LTE?"), AMF 206 determines whether to move terminal 102 to access network 106. If not, AMF 206 sends service-reply message 410 to terminal 102 ("No").

If terminal 102 is to be moved to access network 106 ("Yes"), AMF 206 triggers a handover (e.g., an inter-radio-access-technology, IRAT, handover) (HO). In the illustrated example, AMF 206 sends de-registration message 422 to terminal 102. In response, provided access network 106 is within range, terminal 102 sends an attach request 424 to access network 106. The attach request 424 and subsequent signaling can be performed, e.g., as in the GSM, UMTS, LTE, or 5G standards. Network-initiated de-registration can be performed, e.g., as described in 3GPP 23.502 § 4.2.2.3.3. In some examples, after terminal 102 has attached to second access network 106, terminal 102 will wait for all bearers to become idle before evaluating whether to re-attach to first access network 104.

Call flow 400 can permit performing attach control without requiring any attach-control-specific action by terminal 102. Therefore, call flow 400 can be used with a large number of types of terminals 102. Attach control can reduce the probability of network overload and improve the quality of network services provided.

Figure 5:
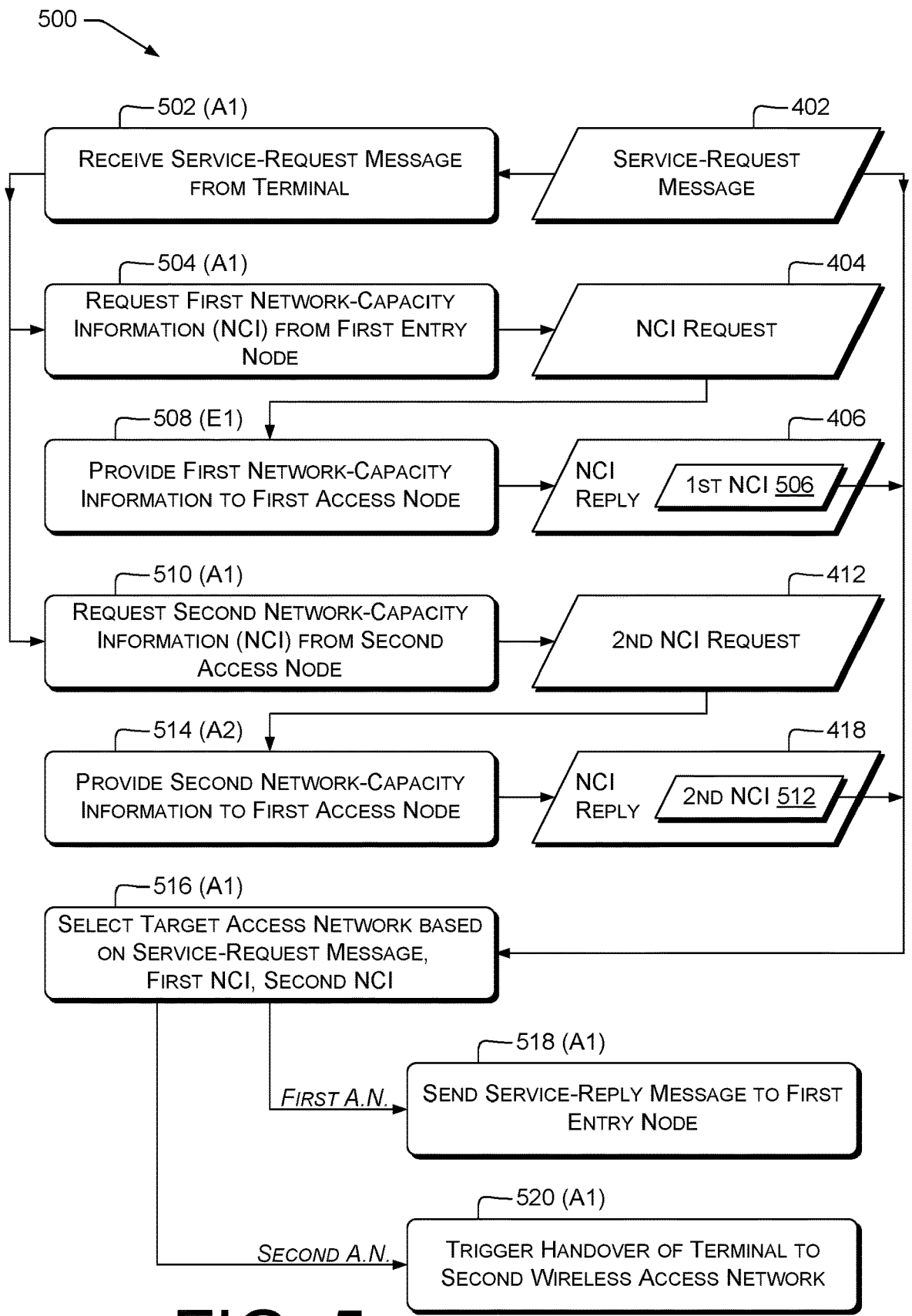
FIG. 5 illustrates an example attach-control process performed in a telecommunications network.

FIG. 5 is a dataflow diagram illustrating an example process 500 for attach control, and related data items. Process 500 can be performed, e.g., by servers 304 of a telecommunications network 100. Network 100 can include first wireless access network 104 (e.g., 5G) having a first entry node 108 (e.g., gNodeB 202) and a first access node 110 (e.g., AMF 206) communicatively connected with first entry node 108. Network 100 can also include second wireless access network 106 (e.g., LTE) having a second entry node 112 (e.g., eNodeB 208) and a second access node 114 (e.g., MME 212) communicatively connected with the second entry node 112 and with the first access node 110. In some examples, first wireless access network 104 is LTE and second wireless access network 106 is 5G, and the first access node 110 is an MME. Each of nodes 108, 110, 112, and 114 can be or include a server 304 or process(es) or module(s) running thereon, or other type(s) of control unit(s) to perform the listed functions. In some examples, server(s) 304 include control unit(s) configured to perform operations described below, e.g., in response to computer program instructions of the attach-processing module 326. For clarity in FIG. 5, and also in FIGS. 6 and 8-10, operations performed by first entry node 108 are marked "(E1)"; by first access node 110 "(A1)"; by second entry node 112 "(E2)"; and by second access node 114 "(A2)".

Operations shown in FIG. 5 and in FIGS. 6 and 8-12, discussed below, can be performed in any order except when otherwise specified, or when data from an earlier step is used in a later step. For clarity of explanation, reference is herein made to various components shown in FIGS. 1-3 that can carry out or participate in the steps of the exemplary methods, and to various operations and messages shown in FIGS. 4 and 7 that can occur while the exemplary method is carried out or as part of the exemplary method. It should be noted, however, that other components can be used; that is, exemplary method(s) shown in FIGS. 5, 6, and 8-12 are not limited to being carried out by the identified components, and are not limited to including the identified operations or messages.

At 502, the first access node 110 receives, via the first entry node, a service-request message 402, e.g., a 5G Service Request, from terminal 102 that is registered with the first wireless access network 104. Block 502 can be followed by blocks 504 or 510, in either order. In some examples, blocks 510 and 514 can be performed at least partly before or at least partly concurrently with blocks 504 and 508. In the example of FIG. 4, blocks 510 and 514 are performed after blocks 504 and 508.

At 504, the first access node 110 requests first network-capacity information 506 from the first entry node 108. Examples are discussed herein, e.g., with reference to NCI request 404.

At 508, the first entry node 108 provides the first network-capacity information 506 to the first access node 110. The first network-capacity information 506 is associated with the first wireless access network 104. Examples are discussed herein, e.g., with reference to NCI reply 406.

At 510, the first access node requests second network-capacity information 512 from the second access node 114. Examples are discussed herein, e.g., with reference to NCI request 412.

At 514, the second access node 114 provides the second network-capacity information 512 to the first access node 110. The second network-capacity information 512 is associated with the second wireless access network 106. For example, MME 212 can advise AMF 206 of the load on LTE access network 106. Examples are discussed herein, e.g., with reference to NCI reply 418.

At 516, the first access node 110 selects a target access network of the first wireless access network 104 and the second wireless access network 106 based at least in part on the service-request message 402, the first network-capacity information 506, and the second network-capacity information 512. If the target access network is the first wireless access network 104, block 518 is next. If the target access network is the second wireless access network 106, block 520 is next.

At 518, in response to a selection of the first wireless access network 104 ("First A.N."), first access node 110 sends a service-reply message 410 to the first entry node 108. The service-reply message 410 can include, e.g., a request from AMF 206 to gNodeB 202 or other components of a 5G RAN via the N2 interface.

At 520, in response to a selection of the second wireless access network 106 ("Second A.N."), the first access node 110 triggers a handover of the terminal to the second wireless access network 106. For example, the first access node 110 can send a de-registration message 422 to terminal 102 via first entry node 108. Examples are discussed herein, e.g., with reference to de-registration message 422.

Figure 6:
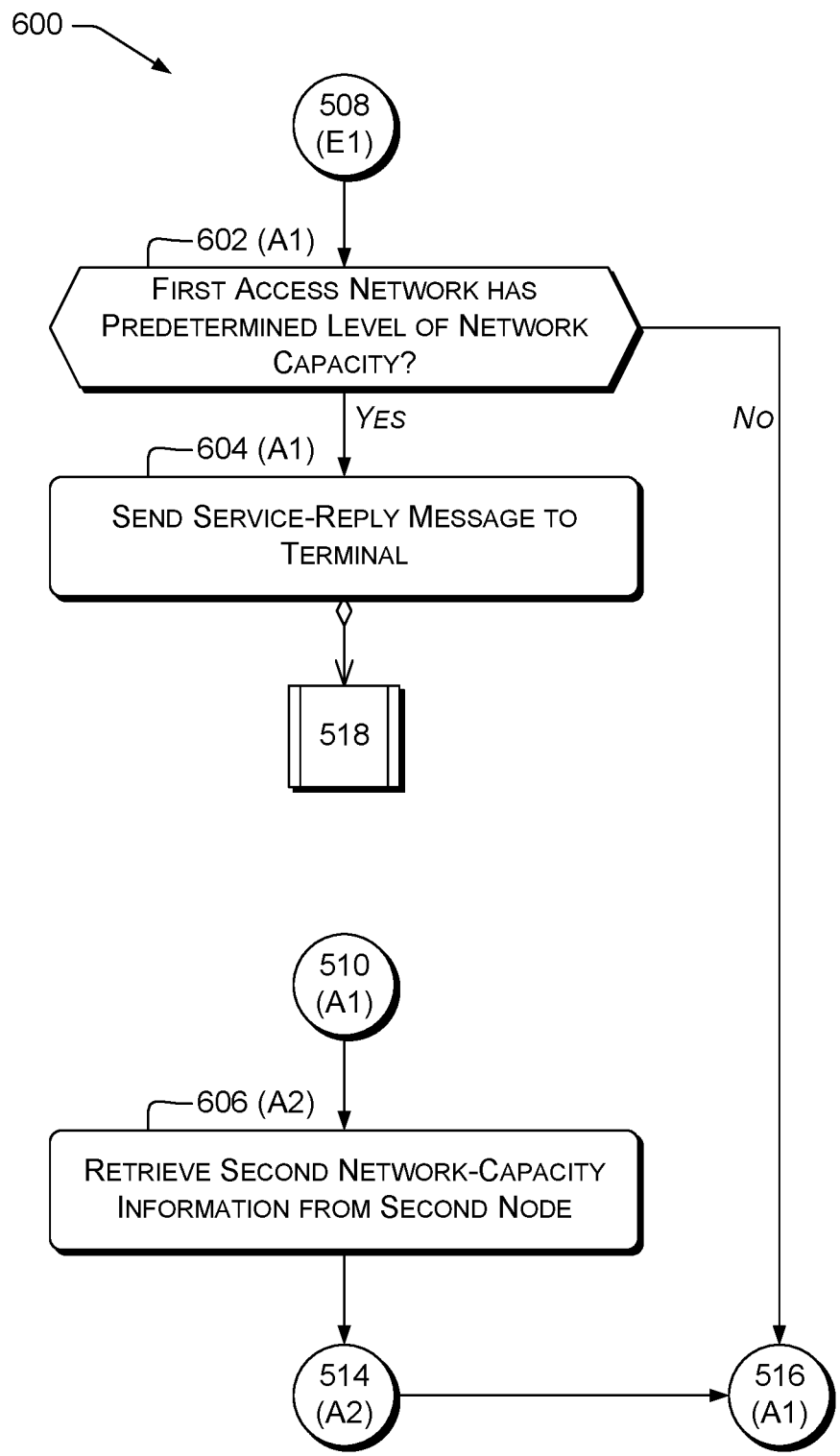
FIG. 6 illustrates example attach-control processes performed in a telecommunications network.

FIG. 6 illustrates an example process 600 performed by server(s) 304 of a telecommunications network 100 for controlling attach. In some examples, server(s) 304 include control unit(s) configured to perform operations described below, e.g., in response to computer program instructions of the attach-processing module 326. In some examples, block 508 can be followed by block 602, block 604 can include block 518, block 510 can be followed by block 606, or block 606 can be followed by block 514.

At 602, the first access node 110 determines, before selecting the target access network and based at least in part on the first network-capacity information 506, whether the first wireless access network 104 has at least a predetermined level of network capacity. If so, block 604 is next; if not, block 516 (select target access network) is next. Examples are discussed herein, e.g., with reference to block 408.

At 604, the first access node 110 sends the service-reply message 410 to the terminal via the first entry node in response to a determination that the first wireless access network 104 has at least the predetermined level of network capacity. Examples are discussed herein, e.g., with reference to block 518. In some examples, block 604 can include block 518. As discussed above with reference to FIG. 4, this can reduce the signaling required to determine the appropriate access network for terminal 102 in low-load or other high-capacity situations.

At 606, the second access node 114 retrieves the second network-capacity information 512 from the second entry node 112. Block 606 can be performed in response to second NCI request 412. For example, MME 212 can query eNodeB 208 for information about the current load or capacity of cell(s) controlled by that eNodeB 208. MME 212 can then determine the second NCI reply 418 based at least in part on the information from eNodeB 208. This can permit using information from both eNodeB 208 and gNodeB 202, even if the two are separated geographically or in the network topology.

Further Illustrative Messages and Operations

Figure 7:
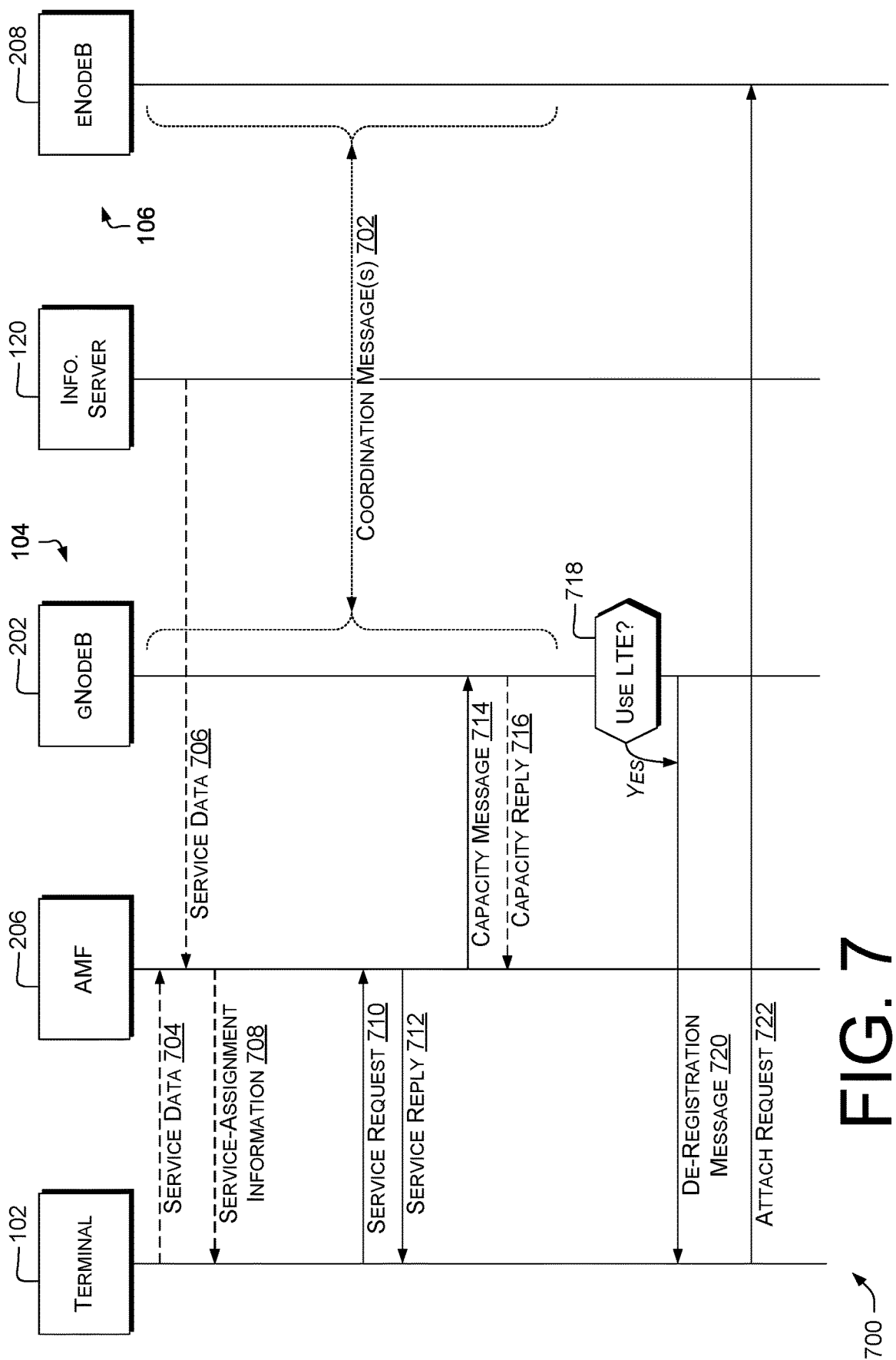
FIG. 7 is a call flow showing an example of attach control by coordinating entry nodes.

FIG. 7 is a partial call flow 700 showing examples of attach control. Some examples, shown dashed for clarity, include messages when terminal 102 registers with access network 104. Some examples, shown in solid lines for clarity, include messages when terminal 102 requests a network service, e.g., VoLTE or Internet data, from access network 104. Some examples include communications with an information server 120 such as a 5G UDM or UDR, a 4G HSS, a 2G/3G HLR, or another server holding profile information associated with terminal 102 or a corresponding network subscriber.

As shown by the stippled lines, gNodeB 202 and eNodeB 208 can send and receive one or more coordination messages 702 in parallel with or interleaved between any other messages shown herein before block 718. For example, a coordination message can carry network-capacity information associated with access network 106 from eNodeB 208 to gNodeB 202. This can permit, e.g., gNodeB 202 to compare network-capacity information for access networks 104, 106.

When registering, terminal 102 can send service data 704 to AMF 206. Additionally or alternatively, AMF 206 can retrieve service data 706 from information server 120, e.g., by sending a query (omitted for brevity). Service data 704, 706 can indicate, e.g., network-capacity requirements associated with various network services that may be requested by terminal 102, or capabilities of terminal 102. For example, service data 704, 706 can indicate whether a subscriber using terminal 102 is authorized to use 5G services.

In some examples, AMF 206 can send service-assignment information 708 to terminal 102. Terminal 102 can store service-assignment information 708 and later use it to communicate network-capacity requirements to AMF 206, e.g., in the form of 5G Session IDs or (session ID, QCI) tuples.

Terminal 102 sends a service-request message 710 (which can represent service-request message 402) to request a network service. AMF 206 responds with a service reply message 712 (which can represent service-reply message 410).

Before, after, or concurrently with sending service-reply message 712, AMF 206 sends a capacity message 714 to gNodeB 202. The capacity message 714 includes service data (e.g., determined based at least in part on service data 704, 706) indicating network-capacity requirements associated with the network service requested by terminal 102. In response, gNodeB 202 can send a capacity-reply message 716 to AMF 206. For example, the capacity-reply message 716 can be a 3GPP RRC Connection Reconfiguration message indicating resources allocated for the requested service. In some examples not shown, AMF 206 sends service-reply message 712 only after receiving capacity-reply message 716.

In some examples, coordination messages 702 or capacity messages 714 can be sent on any of the schedules or sets of timing discussed above with reference to NCI requests 404, 412. In some examples, upon receiving a capacity message 714, first entry node 108 can determine whether one or more terminals 102 should be moved to second access network 106. This can provide opportunities to balance load between access networks 104, 106 with respect to terminals 102 other than or in addition to the terminal 102 that sent service-request message 710.

At 718, gNodeB 202 determines whether terminal 102 should be handed over to access network 106, e.g., LTE. The gNodeB 202 can make this determination based at least in part on the service data from capacity message 714 and the network-capacity information for access networks 104, 106, retrieved via coordination message(s) 702. If not, the session can continue on access network 104. If so ("Yes"), gNodeB 202 can trigger a handover of terminal 102 to access network 106. For example, gNodeB 202 can send a de-registration message 720 (which can represent deregistration message 422) to terminal 102. Terminal 102 can, in response, send an attach request 722 (which can represent attach request 424) to access network 106. De-registration message 720 can be, e.g., a 5G Network-initiated deregistration request, or a custom message. Additionally or alternatively, de-registration message 720 can represent a header, field, or other value within another message. In some examples, gNodeB 202 triggers the handover after setup of the session has been completed (e.g., by way of service-reply message 712).

Call flow 700 can perform attach control without requiring the involvement of second access node 114. Call flow 700 can reduce the number of messages required for attach control, reducing the network load of attach control itself.

Figure 8:
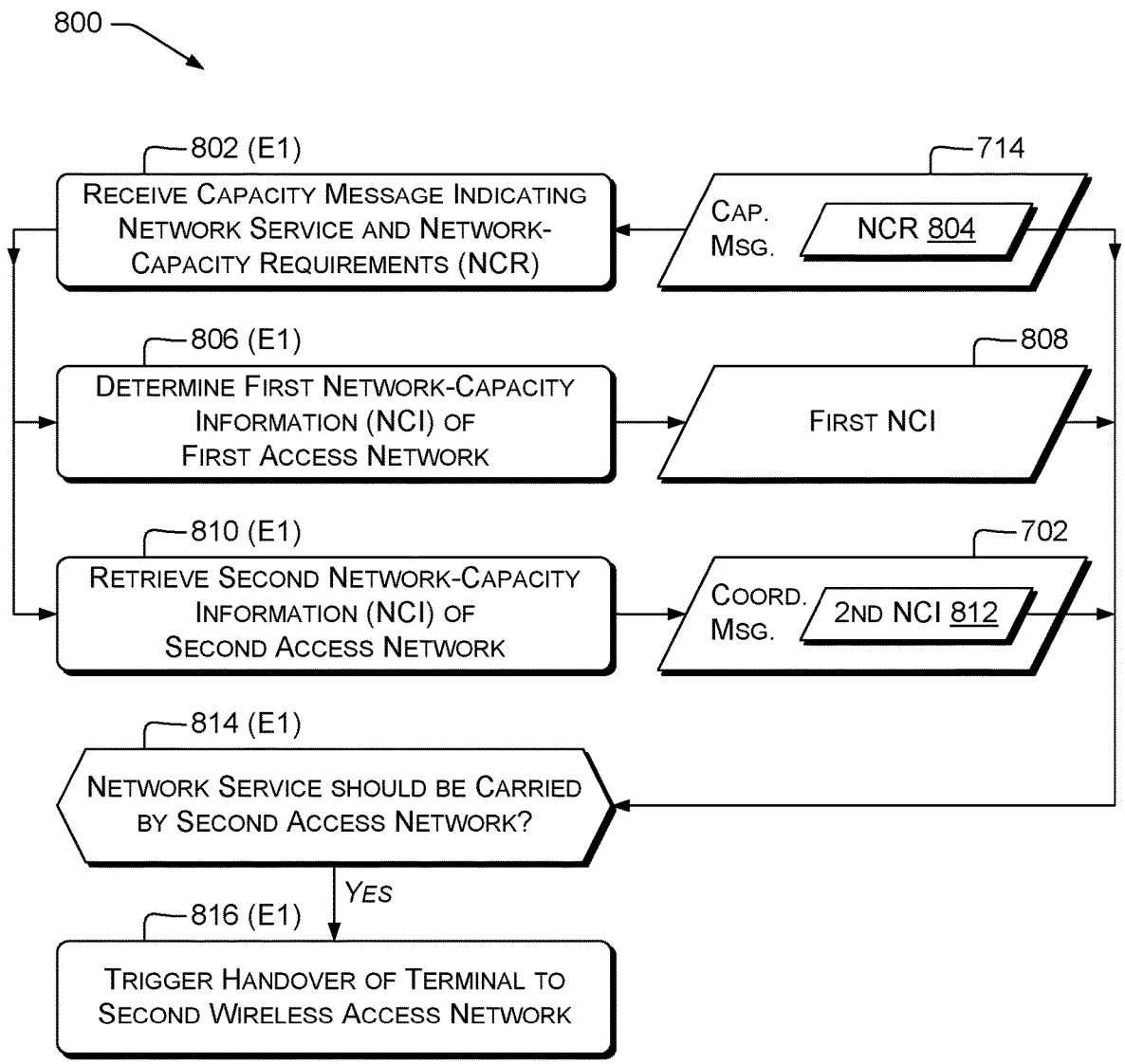
FIG. 8 illustrates an example attach-control process performed at an entry node of an access network.

FIG. 8 is a dataflow diagram illustrating an example process 800 for attach control, and related data items. Process 800 can be performed, e.g., by servers 304 of a telecommunication system such as telecommunications network 100. The telecommunication system can include components such as those described herein with reference to process 500. For example, a first access network 104 can provide wireless communications to terminal 102. In some examples, server(s) 304 include control unit(s) configured to perform operations described below, e.g., in response to computer program instructions of the attach-processing module 326 or coordination module 328. In some examples, operations of process 800 are performed by a control unit of first entry node 108, e.g., a gNodeB of a 5G first access network 104 or an eNodeB of an LTE access network. In some examples, the telecommunication system includes a coordination channel 214.

At 802, the control unit receives a capacity message 714 indicating a network service requested by the terminal 102 and network-capacity requirements 804 associated with the network service. Block 802 can be followed by blocks 806 and 810 in either order, or concurrently.

At 806, the control unit determines first network-capacity information 808 associated with the first access network 104. Examples are discussed herein, e.g., with reference to block 504.

At 810, the control unit retrieves second network-capacity information 812 from second entry node 112, e.g., under control of coordination module 328. The second entry node 112 and the second network-capacity information 812 are associated with second access network 106. Examples are discussed herein, e.g., with reference to blocks 510 or 606. For example, the control unit can receive a coordination message 702 carrying the second NCI 812.

In some examples including a coordination channel 214 between the first entry node 108 and the second entry node 112, the first entry node 108 can retrieve the second network-capacity information 812 from the second entry node 112 via the coordination channel 214. In other examples, the first entry node 108 can retrieve the second NCI 812 via SS7, IP, or other network links.

At 814, the control unit determines whether the network service should be carried by the second access network 106. This determination can be based at least in part on the network-capacity requirements 804, the first network-capacity information 808, and the second network-capacity information 812. Examples are discussed herein, e.g., with reference to blocks 516 or 718. If not, normal session processing can continue. If so, block 816 is next.

In some examples, block 814 includes selecting the target access network based at least in part on parameters included in the network-capacity requirements 804, such as the QCI or ARP values.

At 816, the control unit triggers a handover of the terminal to the second access network, e.g., in response to a selection of the second access network 106. Examples are discussed herein, e.g., with reference to block 520. For example, the control unit can send a de-registration message 720 to the terminal 102 via the first entry node 108.

Figure 9:
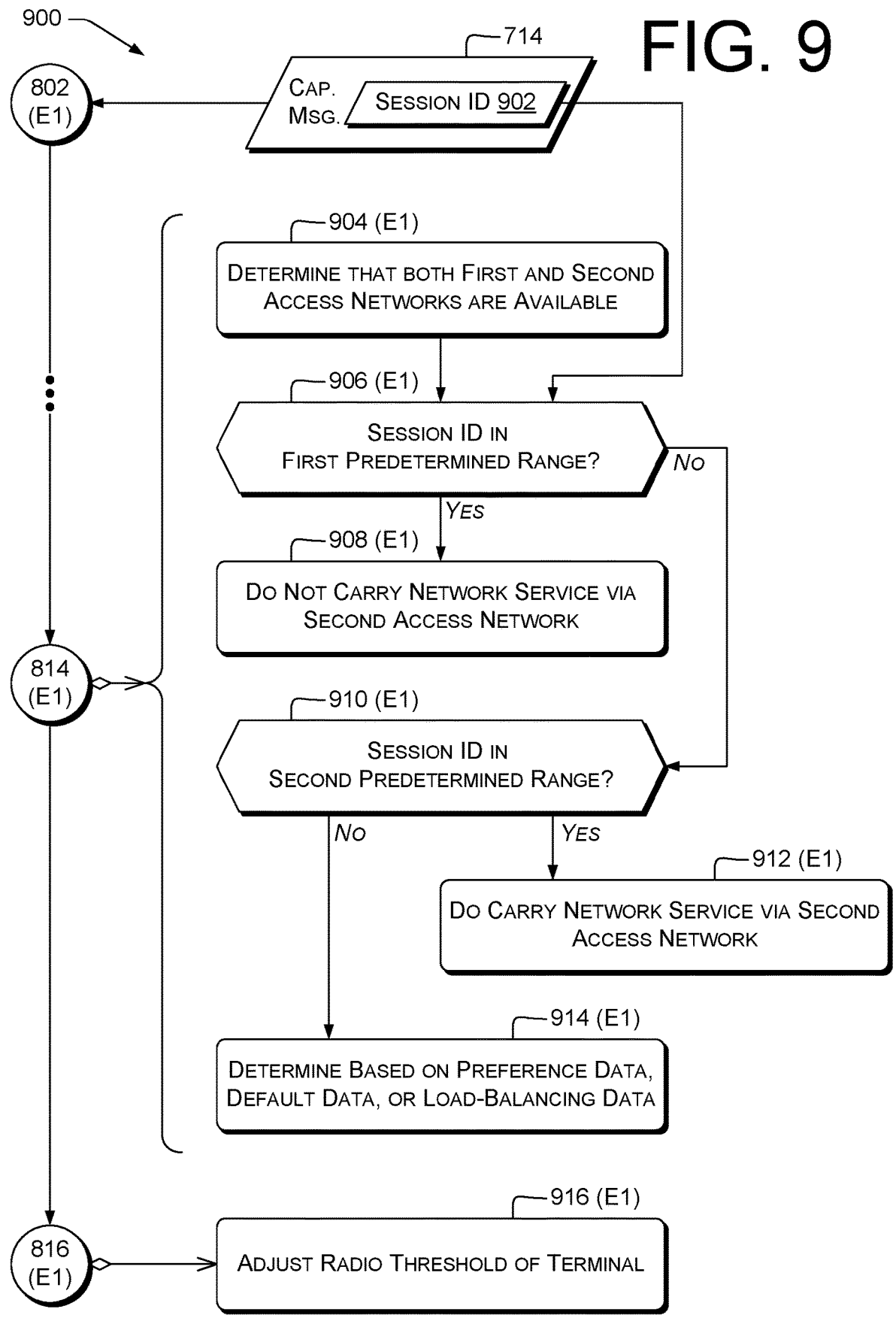
FIG. 9 illustrates example attach-control processes using session identifiers.

FIG. 9 illustrates an example process 900 performed by server(s) 304 of a telecommunications network 100 for controlling attach. In some examples, server(s) 304 include control unit(s) configured to perform operations described below, e.g., in response to computer program instructions of the attach-processing module 326. In some examples, the capacity message 714 comprises a session identifier 902, e.g., a 5G Session ID, a 5G QoS flow ID, a QCI, or a combination of those. In some of these examples, block 814 of determining whether the network service should be carried by the second access network can include blocks 904-912, e.g., performed by the control unit of the first entry node 108. In some examples, block 816 can include block 916.

At 904, the control unit determines that both the first access network 104 and the second network 106 are available. In some examples, session identifier 902 is used to determine the appropriate access network when both networks 104, 106 are available.

At 906, the control unit determines whether the session identifier 902 is within a first predetermined range. For example, a session ID range of 1-999 can indicate that the first access network 104 is preferred. If the session identifier 902 is within the first predetermined range, block 908 is next; otherwise, block 910 is next.

At 908, the control unit determines that the network service should not be carried by the second access network, e.g., in response to the session identifier 902 within the first predetermined range.

At 910, the control unit determines whether the session identifier 902 is in a second predetermined range. If the session identifier 902 is within the second predetermined range, block 912 is next; otherwise, block 914 is next. For example, a session ID range of 1000-4999 can indicate that the second access network is preferred. In some examples, the first and second predefined ranges are disjoint.

At 912, the control unit determines that the network service should be carried by the second access network 106, e.g., in response to the session identifier 902 within the second predetermined range.

At 914, in some examples, if the session identifier is neither within the first predetermined range nor within the second predetermined range, the control unit can, e.g., based on stored preference or default-action data, perform one of: determining that the network service should be carried by the second access network 106; determining that the network service should not be carried by the second access network 106; or determining whether or not the network service should be carried by the second access network 106 based on stored load-balancing data. For example, the load-balancing data can indicate whether the last execution of block 912 determined that the network service should be carried by the second access network 106, and the control unit can determine the opposite result (e.g., alternating between the first and second access networks 104, 106).

At 916, the control unit sends a message to terminal 102 to change at least one handover threshold used by terminal 102. For example, terminal 102 can spontaneously hand over from first access network 104 to second access network 106 when a measurement of signal quality with respect to entry node 108 falls below a corresponding handover threshold. Examples of such measurements can include Received Signal Strength Indicator (RSSI) and Reference Signal Received Power (RSRP). The control unit can instruct terminal 102 to change its threshold to a level known to the control unit (e.g., through prior communications with terminal 102) to be above the present level of the measurement, or to a level that is reserved or substantially physically unachievable. For example, if terminal 102 has recently reported an RSSI of −100 dBm, the control unit can send a message changing the handover threshold to −90 dBm. Terminal 102 will then see that its RSSI is below the threshold, and handover to the second access network 106. Additionally or alternatively, the control unit can set the threshold to a maximum representable value, e.g., −44 dBm. The measurements at terminal 102 will always or almost always be below this value, thereby causing terminal 102 to hand over upon the next check of the measurements.

Figure 10:
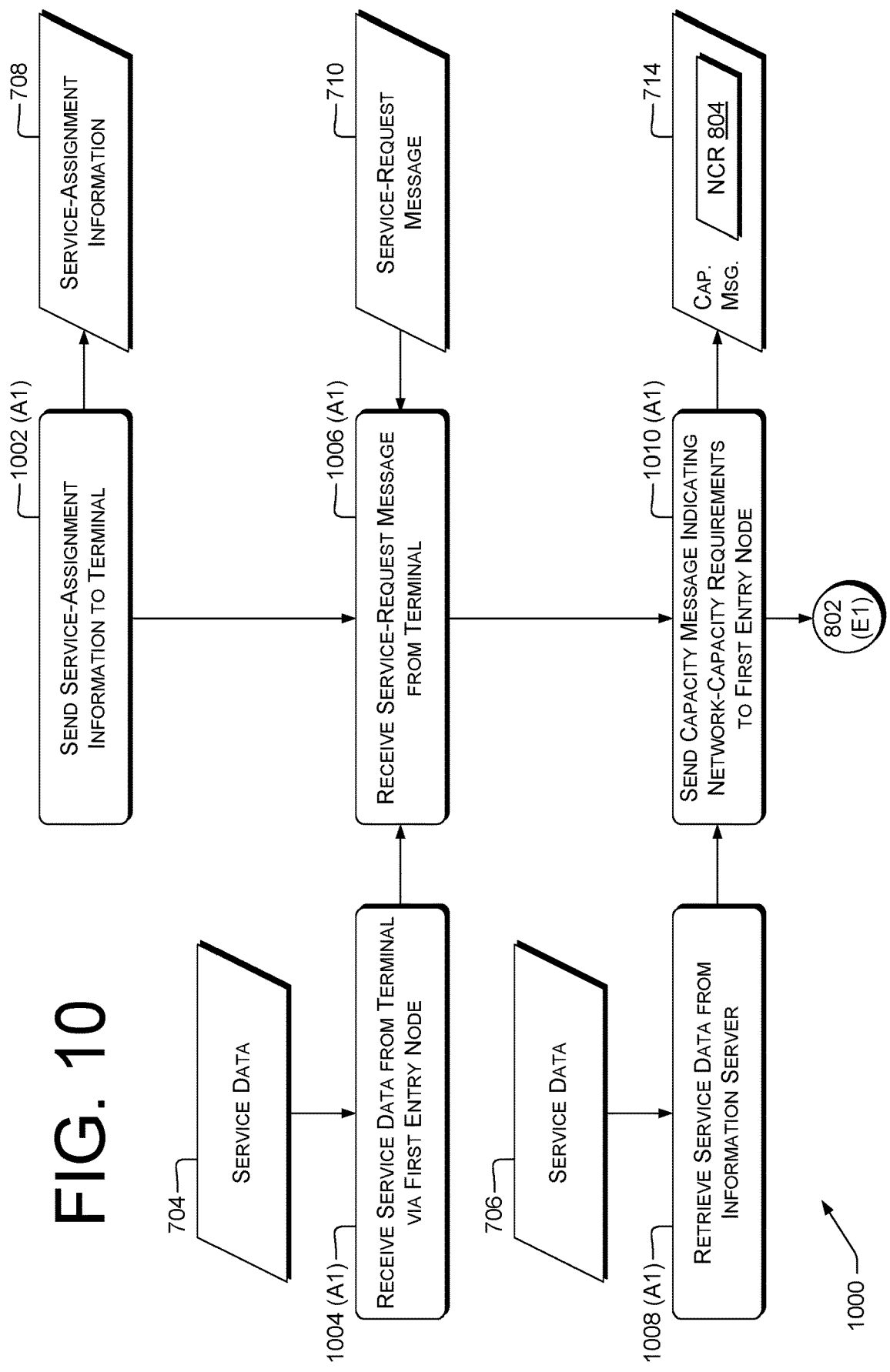
FIG. 10 illustrates example attach-control processes performed at an access node of an access network.

FIG. 10 illustrates an example process 1000 performed by server(s) 304 of a telecommunications system for controlling attach. In some examples, the system includes a first access node 110, e.g., AMF 206 or MME 212. The first access node 110 includes at least one control unit to perform the recited operations, e.g., in response to computer program instructions of the attach-processing module 326. In some examples, any of blocks 1002-1010 can precede block 802, or blocks 1002 or 1004 can precede block 1006, or blocks 1006 or 1008 can precede block 1010.

At 1002, before receiving the service-request message 710, first access node 110 can send service-assignment information 708 to terminal 102. The service-assignment information can permit terminal 102 to select session identifiers 902 in the first or second predetermined ranges discussed above with reference to FIG. 9, for example.

At 1004, first access node 110 can receive service data 704 from terminal 102 via first entry node 108. For example, terminal 102 can provide information about its service requests or capabilities during initial registration. In some examples, block 1004 is performed before receiving a service-request message 710 (block 1006).

At 1006, the first access node 110 receives, via the first entry node 108, a service-request message 710 from terminal 102, e.g., a terminal 102 registered with the first access network 104. The service-request message 710 indicates the network service requested by the terminal 102.

At 1008, first access node 110 can retrieve service data 706 from information server 120 Block 1008 can be performed before block 1010 of sending the capacity message 714. For example, AMF 206 can pull service data 706 from an HSS or UDR. This can be in response to the service-request message 710, or beforehand (e.g., at registration time). Block 1006 can be performed before, after, or concurrently with block 1008. In some examples, both blocks 1004 and 1008 are used; in other examples, at most one of blocks 1004 and 1008 is used.

At 1010, the first access node 110 sends the capacity message 714 to the first entry node 108 in response to the service-request message 710. The capacity message 714 can include an indication of the service request, e.g., an indication that the request was successful or otherwise should be processed. The capacity message 714 can include data indicating the network-capacity requirements 804 associated with the network service. For example, first access node 110 can determine the network-capacity requirements 804 using information in the service data 704 or 706. Block 1010 can be followed by block 802.

Still Further Illustrative Messages and Operations

Figure 11:
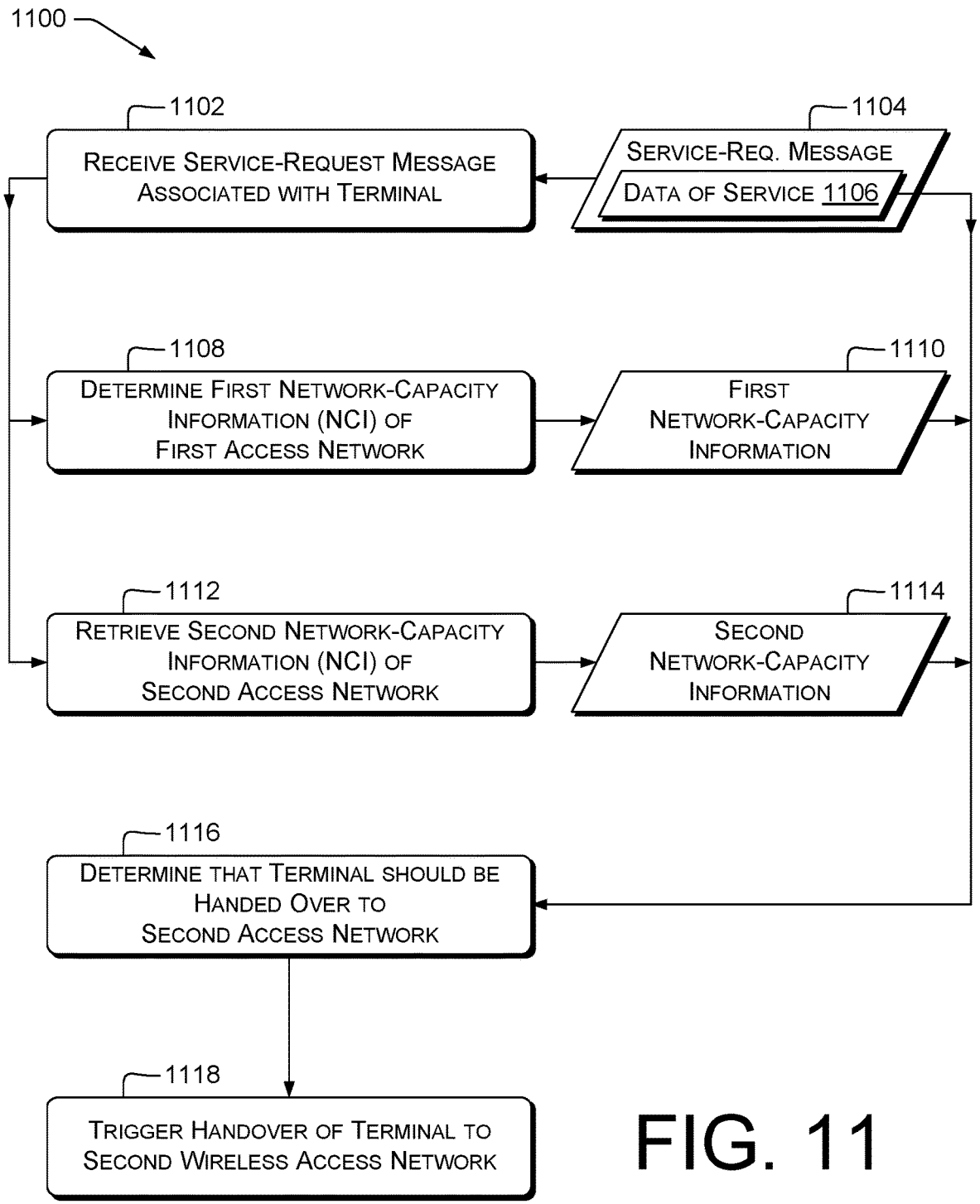
FIG. 11 illustrates an example attach-control process performed at a node of an access network.

FIG. 11 is a dataflow diagram illustrating an example process 1100 for attach control, and related data items. Process 1100 can be performed, e.g., by servers 304 of a telecommunication system such as telecommunications network 100. The telecommunication system can include components such as those described herein with reference to process 500. In some examples, server(s) 304 include control unit(s) configured to perform operations described below, e.g., in response to computer program instructions of the attach-processing module 326 or coordination module 328. In some examples, operations of process 800 are performed by a control unit of a first node of first access network 104, e.g., first entry node 108 or first access node 110. For example, the first node can be AMF 206, gNodeB 202, MME 212, or eNodeB 208. Blocks 1108 and 1112 can be performed in either order, or concurrently.

At 1102, the control unit receives a service-request message 1104 associated with a terminal 102 that is registered with the first access network 104. The service-request message 1104 can include data 1106 indicating a network service requested by terminal 102. Service-request message 1104 can represent service-request message 402 or 710. Examples are discussed herein, e.g., with reference to blocks 502 or 802.

At 1108, the control unit determines first network-capacity information 1110 of the first access network 104. Examples are discussed herein, e.g., with reference to blocks 504, 508, or 806, or messages 404 or 406. First NCI 1110 can represent NCI 506 or 808.

At 1112, the control unit retrieves second network-capacity information 1114 of a second, different access network 106. Examples are discussed herein, e.g., with reference to blocks 510, 514, 606, or 810, or messages 412-418 or 702. Second NCI 1114 can represent NCI 512 or 812.

At 1116, the control unit determines, based at least in part on the network service (e.g., as represented by data 1106), the first network-capacity information 1110, and the second network-capacity information 1114, that the terminal should be handed over to the second access network 106. Examples are discussed herein, e.g., with reference to blocks 408, 420, 516, 602, 718, 814, or 904-914.

At 1118, the control unit triggers a handover of the terminal 102 to the second access network 106. Block 1118 can be performed in response to the determination at block 1116. Examples are discussed herein, e.g., with reference to blocks 420, 520, 718, or 816, or messages 422 or 720.

Figure 12:
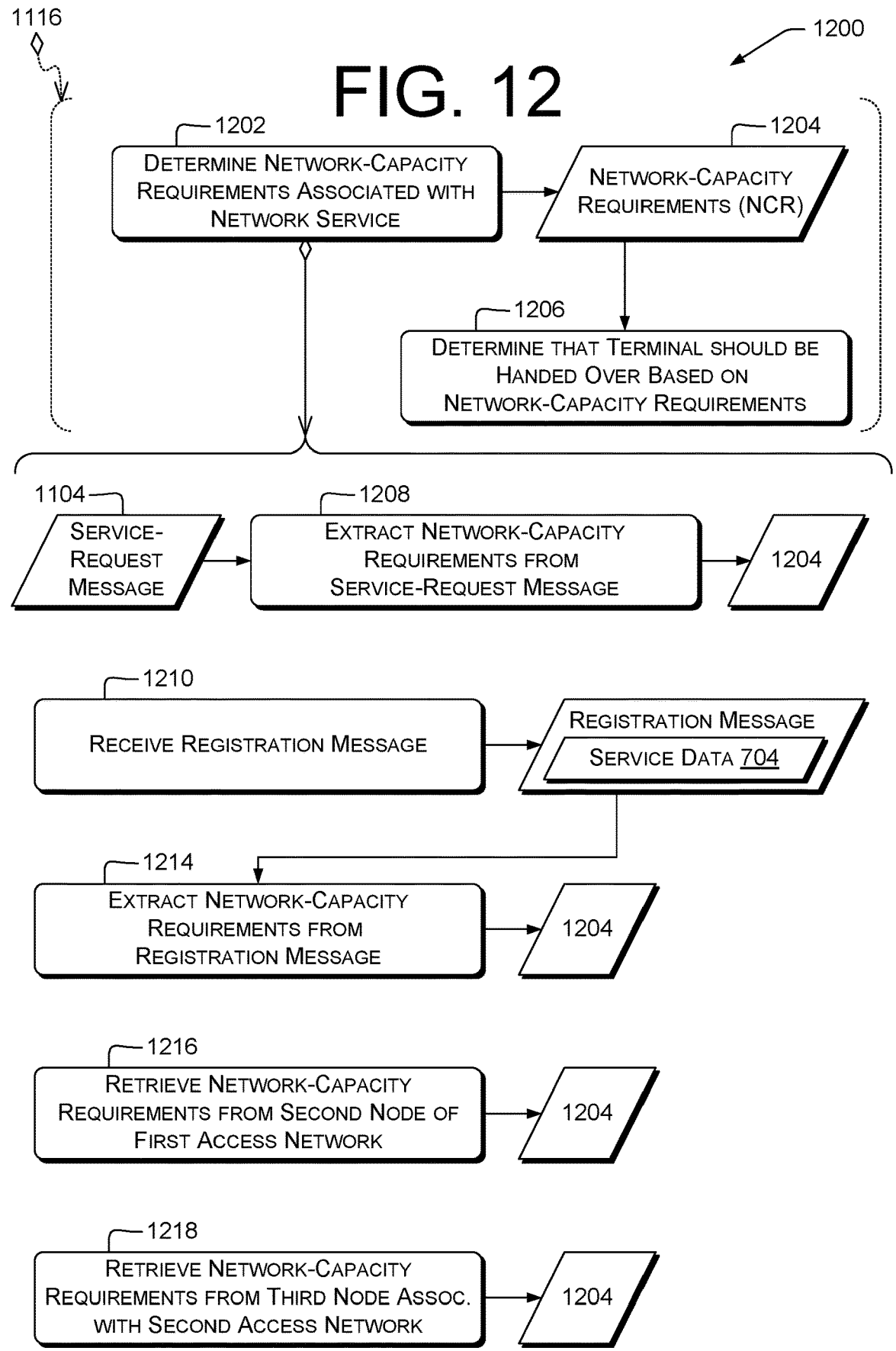
FIG. 12 illustrates example attach-control processes using network-capacity requirements.

FIG. 12 illustrates an example process 1200 performed by server(s) 304 of a telecommunications network 100 for controlling attach. In some examples, server(s) 304 include control unit(s) configured to perform operations described below, e.g., in response to computer program instructions of the attach-processing module 326. In some examples, block 1116 can include blocks 1202-1206. In some examples, block 1202 can include blocks 1208-1218.

Some examples operate in telecommunication systems including a first node associated with the first access network 104 and a third node associated with the second access network. In some examples, the first access network is a 3GPP 5G access network; the first node is an AMF 206; the second access network is an LTE access network; and the third node is an MME 212. In some examples, the first access network is a 3GPP 5G access network; the first node is a gNodeB 202; the second access network is an LTE access network; and the third node is an eNodeB 208. In some examples, the roles of 5G and LTE are swapped compared to the preceding sentences in this paragraph.

At 1202, the control unit determines network-capacity requirements 1204 (NCR) associated with the network service. NCR 1204 can represent NCR 804. Examples are discussed herein, e.g., with reference to block 802 or message 714. Block 1202 can include at least one of blocks 1208-1218, e.g., exactly one of blocks 1208, 1210, 1216, or 1218.

At 1206, the control unit determines that the terminal should be handed over further based on the network-capacity requirements 1204. Examples are discussed herein, e.g., with reference to blocks 718 or 814.

At 1208, the control unit extracts the network-capacity requirements 1204 from the service-request message 1104. For example, the control unit can determine the NCR 1204 containing information from, or based at least in part on, a header, header-field value, body, or other portion of service-request message 1104. In some examples, the extracted NCR 1204 can indicate, e.g., which types of access network 104, 106 the terminal 102 can use; whether the terminal 102 can use specific service types, such as video; or which session or network service is being requested. For example, service-request message 1104 can include a 5G Session ID identifying the service. Accordingly, block 1208 can be used with operations shown in FIG. 9.

At 1210, the control unit receives a registration message 1212, e.g., a SIP REGISTER request or 5G AN Initial Registration message, from the terminal. Registration message 1212 can include service data 704. Block 1210 can be performed before receiving service-request message 1104. Block 1210 can be followed by block 1214.

At 1214, the control unit extracts the network-capacity requirements 1204 from the registration message 1212, e.g., from the service data 704 in the registration message 1212. For example, the control unit can perform extraction such as described above with reference to block 1208. In various examples, the extracted NCR 1204 can indicate which session(s) or network service(s) are requested initially, or are supported by terminal 102. For example, the registration message 1212 can indicate device capabilities of terminal 102.

At 1216, the control unit retrieves the network-capacity requirements from a second node of the first access network. Block 1216 can be performed after receiving the service-request message 1104, in some examples. In an example in which the first node is a gNodeB 202, the second node can be an AMF 206 or an information server 120. Block 1216 can be used to retrieve the NCR 1204 from a core network device of access network 104.

At 1218, the control unit retrieves the second network-capacity information from a third node. The third node is associated with the second access network 106. In an example in which the first node is a gNodeB 202, the third node can be an eNodeB 208. This can permit attach processing between intercommunicating nodes such as gNodeB 202 and eNodeB 208, or AMF 206 and MME 212. Additionally or alternatively, the third node can be an information server 120.

EXAMPLE CLAUSES

Various examples include one or more of, including any combination of any number of, the following example features. Throughout these clauses, parenthetical remarks are for example and explanation, and are not limiting. Parenthetical remarks given in this Example Clauses section with respect to specific language apply to corresponding language throughout this section, unless otherwise indicated.

A: A telecommunications network, comprising: a first wireless access network, comprising: a first entry node; and a first access node communicatively connected with the first entry node; and a second wireless access network, comprising: a second entry node; and a second access node communicatively connected with the second entry node and with the first access node; wherein: the first access node is configured to receive, via the first entry node, a service-request message from a terminal that is registered with the first wireless access network; the first access node is configured to request first network-capacity information from the first entry node; the first entry node is configured to provide the first network-capacity information to the first access node, the first network-capacity information associated with the first wireless access network; the first access node is configured to request second network-capacity information from the second access node; the second access node is configured to provide the second network-capacity information to the first access node, the second network-capacity information associated with the second wireless access network; the first access node is configured to select a target access network of the first access wireless network and the second wireless access network based at least in part on the service-request message, the first network-capacity information, and the second network-capacity information; the first access node is configured to, in response to a selection of the first wireless access network, send a service-reply message to the first entry node; and the first access node is configured to, in response to a selection of the second wireless access network, trigger a handover of the terminal to the second wireless access network.

B: The telecommunications network according to paragraph A, wherein the first access node is configured to trigger the handover by performing operations comprising sending a de-registration message to the terminal via the first entry node.

C: The telecommunications network according to paragraph A or B, wherein the first access node is further configured to: determine, before selecting the target access network and based at least in part on the first network-capacity information, whether the first wireless access network has at least a predetermined level of network capacity; in response to a determination that the first wireless access network has at least the predetermined level of network capacity, send the service-reply message to the terminal via the first entry node; and in response to a determination that the first wireless access network does not have at least the predetermined level of network capacity, select the target access network.

D: The telecommunications network according to any of paragraphs A-C, wherein the second access node is further configured to retrieve the second network-capacity information from the second entry node.

E: The telecommunications network according to any of paragraphs A-D, wherein: the first wireless access network is a 3GPP fifth-generation (5G) access network; the first entry node is a gNodeB; the first access node is a 5G Access and Mobility Management Function (AMF); the second wireless access network is a 3GPP Long-Term Evolution (LTE) access network; the second entry node is an eNodeB; and the second access node is an LTE mobility management entity (MME).

F: The telecommunications network according to any of paragraphs A-E, wherein the first access node is further configured to, before receiving the service-request message, receive an indication (e.g., data at registration time, e.g., from terminal, HSS, or UDR) that: the terminal supports connectivity via both the first access network and the second access network; and the terminal is operating in a single-connectivity mode (e.g., because it is an SR terminal, or because one radio is not currently being used for cellular service).

G: A telecommunication system, comprising: a first entry node of a first access network, the first access network providing wireless communications to a terminal and the first entry node configured to: receive a capacity message indicating a network service requested by the terminal and network-capacity requirements associated with the network service; determine first network-capacity information associated with the first access network; retrieve second network-capacity information from a second entry node, the second entry node and the second network-capacity information associated with a second access network; determine whether the network service should be carried by the second access network based at least in part on the network-capacity requirements, the first network-capacity information, and the second network-capacity information; and if so, trigger a handover of the terminal to the second access network.

H: The telecommunication system according to paragraph G, wherein: the capacity message comprises a session identifier; and the first entry node is configured to determine whether the network service should be carried by the second access network by performing operations comprising: determining that both the first access network and the second network are available; determining whether the session identifier is within a first predetermined range; if the session identifier is within the first predetermined range, determining that the network service should not be carried by the second access network; if the session identifier is not within the first predetermined range, determining whether the session identifier is in a second predetermined range; and if the session identifier is within the second predetermined range, determining that the network service should be carried by the second access network.

I: The telecommunication system according to paragraph H, the first entry node further configured to, if the session identifier is neither within the first predetermined range nor within the second predetermined range, taking an action based at least in part on stored preference or default-action data, wherein the action is selected from the group consisting of: determining that the network service should be carried by the second access network; determining that the network service should not be carried by the second access network; or determining whether or not the network service should be carried by the second access network based on stored load-balancing data.

J: The telecommunication system according to paragraph I, the first entry node further configured to determine that the network service should be carried by the second access network if the load-balancing data indicates the last-processed communication session was not carried by the second access network, and vice versa.

K: The telecommunication system according to any of paragraphs G-J, wherein the first entry node is configured to trigger the handover by performing operations comprising sending a de-registration message to the terminal via the first entry node.

L: The telecommunication system according to any of paragraphs G-K, further comprising a coordination channel between the first entry node and the second entry node, wherein the first entry node is configured to retrieve the second network-capacity information from the second entry node via the coordination channel.

M: The telecommunication system according to any of paragraphs G-L, wherein: the first access network is a 3GPP fifth-generation (5G) access network; the first entry node is a gNodeB; the second access network is a 3GPP Long-Term Evolution (LTE) access network; and the second entry node is an eNodeB.

N: The telecommunication system according to any of paragraphs G-M, further comprising a first access node of the first access network, wherein the first access node is configured to: receive, via the first entry node, a service-request message from the terminal, wherein the terminal is registered with the first access network and the service-request message indicates the network service requested by the terminal; and send, in response to the service-request message, the capacity message to the first entry node, the capacity message comprising: an indication of the service request; and data indicating the network-capacity requirements associated with the network service;

O: The telecommunication system according to paragraph N, wherein the first access node is configured to, before receiving the service-request message, receive the service data from the terminal via the first entry node.

P: The telecommunication system according to paragraph N or O, wherein the first access node is further configured to, before sending the capacity message, retrieve service data from an information server.

Q: The telecommunication system according to any of paragraphs N-P, wherein the first access node is further configured to, before receiving the service-request message, send service-assignment information to the terminal.

R: The telecommunications network according to any of paragraphs G-Q, wherein the first access node is further configured to, before receiving the service-request message, receive an indication (e.g., data at registration time, e.g., from terminal, HSS, or UDR) that: the terminal supports connectivity via both the first access network and the second access network; and the terminal is operating in a single-connectivity mode (e.g., because it is an SR terminal, or because one radio is not currently being used for cellular service).

S: The telecommunication system according to any of paragraphs G-R, the first entry node further configured to trigger the handover by performing operations comprising sending a message to the terminal to cause the terminal to change at least one handover threshold of the terminal.

T: A method comprising, by a control unit of a first node of a first access network, performing operations comprising: receiving a service-request message associated with a terminal that is registered with the first access network, the service-request message indicating a network service requested by the terminal; determining first network-capacity information of the first access network; retrieving second network-capacity information of a second, different access network; determining, based at least in part on the network service, the first network-capacity information, and the second network-capacity information, that the terminal should be handed over to the second access network; and in response, triggering a handover of the terminal to the second access network.

U: The method according to paragraph T, the operations further comprising: determining network-capacity requirements associated with the network service; and determining that the terminal should be handed over further based on the network-capacity requirements.

V: The method according to paragraph U, the operations further comprising determining the network-capacity requirements by performing second operations comprising extracting the network-capacity requirements from the service-request message.

W: The method according to paragraph U or V, the operations further comprising determining the network-capacity requirements by performing third operations comprising, before receiving the service-request message: receiving a registration message from the terminal; and extracting the network-capacity requirements from the registration message.

X: The method according to any of paragraphs U-W, the operations further comprising determining the network-capacity requirements by performing fourth operations comprising, after receiving the service-request message, retrieving the network-capacity requirements from a second node of the first access network.

Y: The method according to any of paragraphs T-X, the operations further comprising retrieving the second network-capacity information from a third node, the third node associated with the second access network.

Z: The method according to paragraph Y, wherein: the first access network is a 3GPP fifth-generation (5G) access network; the first node is a 5G Access and Mobility Management Function (AMF); the second access network is a 3GPP Long-Term Evolution (LTE) access network; and the third node is an LTE mobility management entity (MME).

AA: The method according to paragraph Y or Z, wherein: the first access network is a 3GPP fifth-generation (5G) access network; the first node is a gNodeB; the second access network is a 3GPP Long-Term Evolution (LTE) access network; and the third node is an eNodeB.

AB: A computer-readable medium, e.g., a computer storage medium, having thereon computer-executable instructions, the computer-executable instructions upon execution configuring a computer to perform operations as any of paragraphs A-F, G-S, or T-AA recites.

AC: A device comprising: a processor; and a computer-readable medium, e.g., a computer storage medium, having thereon computer-executable instructions, the computer-executable instructions upon execution by the processor configuring the device to perform operations as any of paragraphs A-F, G-S, or T-AA recites.

AD: A system comprising: means for processing; and means for storing having thereon computer-executable instructions, the computer-executable instructions including means to configure the system to carry out a method as any of paragraphs A-F, G-S, or T-AA recites.

AE: A telecommunication system comprising components recited in any of paragraphs A-F.

AF: A first entry node (e.g., a telecommunication device) as recited in any of paragraphs G-S.

AG: A first access node (e.g., a telecommunication device) as recited in any of paragraphs N-Q.

CONCLUSION

Many variations and modifications can be made to the above-described examples, the elements of which are to be understood as being among other acceptable examples. All such modifications and variations are intended to be included herein within the scope of this disclosure and protected by the claims. Moreover, this disclosure is inclusive of combinations of the aspects described herein. References to "a particular aspect" (or "embodiment" or "version") and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting.

The methods, processes, or operations described above can be embodied in, and fully automated via, software code modules executed by one or more computers or processors. As used herein, the term "module" is intended to represent example divisions of the described operations (e.g., implemented in software or hardware) for purposes of discussion, and is not intended to represent any type of requirement or required method, manner or organization. Therefore, while various "modules" are discussed herein, their functionality and/or similar functionality can be arranged differently (e.g., combined into a smaller number of modules, broken into a larger number of modules, etc.). In some instances, the functionality and/or modules discussed herein may be implemented as part of a computer operating system (OS). In other instances, the functionality and/or modules may be implemented as part of a device driver, firmware, application, or other software subsystem.

Example computer-implemented operations described herein can additionally or alternatively be embodied in specialized computer hardware, e.g., FPGAs. For example, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system."

The word "or" and the phrase "and/or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," "one or more of X, Y, or Z," and/or any of those phrases with "and/or" substituted for "or," unless specifically stated otherwise, is to be understood as signifying that an item, term, etc. can be either X, or Y, or Z, or a combination of any elements thereof (e.g., a combination of XY, XZ, YZ, and/or XYZ). Any use herein of phrases such as "X, or Y, or both" or "X, or Y, or combinations thereof" is for clarity of explanation and does not imply that language such as "X or Y" excludes the possibility of both X and Y, unless such exclusion is expressly stated.

As used herein, language such as "one or more Xs" shall be considered synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present, as long as that number is greater than or equal to one.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

In the claims, any reference to a group of items provided by a preceding claim clause is a reference to at least some of the items in the group of items, unless specifically stated otherwise. This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s). Additionally, in any claim using the "comprising" transitional phrase, a recitation of a specific number of components (e.g., "two Xs") is not limited to embodiments including exactly that number of those components, unless expressly specified (e.g., "exactly two Xs"). However, such a claim does describe both embodiments that include exactly the specified number of those components and embodiments that include at least the specified number of those components.

What is claimed is:

1. A telecommunications network, comprising:
    a first wireless access network, comprising:
        a first entry node; and
        a first access node; and
    a second wireless access network, comprising:
        a second entry node; and
        a second access node communicatively connected with the first access node;
    wherein:
        the first access node is configured to receive a service-request message from a terminal that is registered with the first wireless access network;
        the first entry node is configured to provide first network-capacity information to the first access node, the first network-capacity information associated with the first wireless access network;
        the second access node is configured to provide second network-capacity information to the first access node, the second network-capacity information associated with the second wireless access network;
        the first access node is configured to select a target access network of the first wireless access network and the second wireless access network;
        the first access node is configured to, in response to a selection of the first wireless access network, send a service-reply message to the first entry node;
        the first access node is configured to, in response to a selection of the second wireless access network, determine whether to trigger a handover of the terminal to the second wireless access network by sending a de-registration message to the terminal via the first entry node based at least in part on information related to the terminal; and
        the first access node is a 3GPP fifth-generation (5G) node.

2. The telecommunications network according to claim 1, wherein the first access node is further configured to:
    determine, before selecting the target access network and based at least in part on the first network-capacity information, whether the first wireless access network has at least a predetermined level of network capacity;
    in response to a determination that the first wireless access network has at least the predetermined level of network capacity, send the service-reply message to the terminal via the first entry node; and
    in response to a determination that the first wireless access network does not have at least the predetermined level of network capacity, select the target access network.

3. The telecommunications network according to claim 1, wherein the second access node is further configured to retrieve the second network-capacity information from the second entry node.

4. The telecommunications network according to claim 1, wherein:
    the first wireless access network is a 3GPP fifth-generation (5G) access network;
    the first entry node is a gNodeB;
    the second wireless access network is a 3GPP Long-Term Evolution (LTE) access network;
    the second entry node is an eNodeB; and
    the second access node is an LTE mobility management entity (MME).

5. A telecommunication system, comprising:
    a first entry node of a first access network, the first entry node configured to:
        receive a capacity message indicating a network service requested by a terminal and network-capacity requirements associated with the network service;
        determine first network-capacity information associated with the first access network;
        retrieve second network-capacity information from a second entry node, the second entry node and the second network-capacity information associated with a second access network, wherein the first entry node is configured to trigger a handover by sending a de-registration message to the terminal via the first entry node; and
determine whether the network service should be carried by the second access network;
wherein:
the first access network is a 3GPP fifth-generation (5G) access network; and
the second access network is a 3GPP 4G access network or a 3GPP Long-Term Evolution (LTE) access network.

6. The telecommunication system according to claim 5, wherein:
the capacity message comprises a session identifier; and
the first entry node is configured to determine whether the network service should be carried by the second access network by performing operations comprising:
determining whether the first access network is available;
determining whether the second access network is available;
determining whether the session identifier is within a first predetermined range;
if the session identifier is within the first predetermined range, determining that the network service should not be carried by the second access network; and
determining whether the session identifier is in a second predetermined range.

7. The telecommunication system according to claim 5, further comprising a coordination channel between the first entry node and the second entry node, wherein the first entry node is configured to retrieve the second network-capacity information from the second entry node via the coordination channel.

8. The telecommunication system according to claim 5, wherein:
the first access network is a 3GPP fifth-generation (5G) access network;
the first entry node is a gNodeB;
the second access network is a 3GPP Long-Term Evolution (LTE) access network; and
the second entry node is an eNodeB.

9. The telecommunication system according to claim 5, further comprising a first access node of the first access network, wherein the first access node is configured to:
receive, via the first entry node, a service-request message from the terminal, wherein the terminal is registered with the first access network and the service-request message indicates the network service requested by the terminal; and
send, in response to the service-request message, the capacity message to the first entry node, the capacity message comprising:
an indication of the service-request message; and
data indicating network-capacity requirements associated with the network service.

10. The telecommunication system according to claim 9, wherein the first access node is configured to, before receiving the service-request message, receive service data from the terminal via the first entry node.

11. A method comprising:
receiving a service-request message associated with a terminal that is registered with a first access network, the service-request message indicating a network service requested by the terminal;
determining first network-capacity information of the first access network;
retrieving second network-capacity information of a second access network that is different than the first access network; and
determining, based at least in part on the network service, the first network-capacity information, and the second network-capacity information, that the terminal should handover to the second access network by sending a de-registration message to the terminal based at least in part on information related to the terminal.

12. The method according to claim 11, the operations further comprising:
determining network-capacity requirements associated with the network service; and
determining that the terminal should handover further based on the network-capacity requirements.

13. The method according to claim 12, the operations further comprising determining the network-capacity requirements by performing second operations comprising extracting the network-capacity requirements from the service-request message.

14. The method according to claim 12, the operations further comprising determining the network-capacity requirements by performing third operations comprising, before receiving the service-request message:
receiving a registration message from the terminal; and
extracting the network-capacity requirements from the registration message.

15. The method according to claim 12, wherein the service-request message is received via a first node and the operations further comprising determining the network-capacity requirements by performing fourth operations comprising, after receiving the service-request message, retrieving the network-capacity requirements from a second node of the first access network.

16. The method according to claim 15, the operations further comprising retrieving the second network-capacity information from a third node, the third node associated with the second access network.

17. The method according to claim 16, wherein:
the first access network is a 3GPP fifth-generation (5G) access network;
the first node is a 5G Access and Mobility Management Function (AMF);
the second access network is a 3GPP Long-Term Evolution (LTE) access network; and
the third node is an LTE mobility management entity (MME).

18. The method according to claim 16, wherein:
the first access network is a 3GPP fifth-generation (5G) access network;
the first node is a gNodeB;
the second access network is a 3GPP Long-Term Evolution (LTE) access network; and
the third node is an eNodeB.

19. The telecommunications network according to claim 1, further comprising receiving, from a User Data Management (UDM) function, the information related to the terminal.

20. The method according to claim 11, the operations further comprising receiving, from a User Data Management (UDM) function, the information related to the terminal.

* * * * *